(12) United States Patent
Busin et al.

(10) Patent No.: US 11,726,164 B2
(45) Date of Patent: Aug. 15, 2023

(54) WIRELESS DEVICE POSITIONING

(71) Applicant: Telefonaktiebolaget LM Ericsson (publ), Stockholm (SE)

(72) Inventors: Åke Busin, Sollentuna (SE); Iana Siomina, Täby (SE); Sara Modarres Razavi, Linköping (SE); Ritesh Shreevastav, Upplands Väsby (SE); Deep Shrestha, Linköping (SE); Fredrik Gunnarsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 194 days.

(21) Appl. No.: 17/272,500

(22) PCT Filed: Sep. 19, 2019

(86) PCT No.: PCT/SE2019/050886
§ 371 (c)(1),
(2) Date: Mar. 1, 2021

(87) PCT Pub. No.: WO2020/067964
PCT Pub. Date: Apr. 2, 2020

(65) Prior Publication Data
US 2021/0333353 A1 Oct. 28, 2021

Related U.S. Application Data

(60) Provisional application No. 62/737,058, filed on Sep. 26, 2018.

(51) Int. Cl.
*H04W 4/029* (2018.01)
*G01S 5/02* (2010.01)
*H04L 5/00* (2006.01)

(52) U.S. Cl.
CPC .......... *G01S 5/0257* (2013.01); *G01S 5/0278* (2013.01); *H04L 5/0051* (2013.01)

(58) Field of Classification Search
CPC . H04W 64/006; H04W 72/121; H04W 24/10; H04W 24/08; H04L 5/0051;
(Continued)

(56) References Cited

U.S. PATENT DOCUMENTS

2013/0023285 A1* 1/2013 Markhovsky ............. G01S 3/74
455/456.1
2015/0188678 A1 7/2015 Wu et al.
(Continued)

FOREIGN PATENT DOCUMENTS

EP 3306337 A1 4/2018
WO 2018087280 A1 5/2018

OTHER PUBLICATIONS

3GPP, "3rd Generation Partnership Project; Technical Specification Group Radio Access Network; Study on indoor positioning enhancements for UTRA and LTE (Release 13)", 3GPP TR 37.857 V13.1.0 (Dec. 2015), Dec. 2015, 1-82.

*Primary Examiner* — Phuoc H Doan
(74) *Attorney, Agent, or Firm* — Sage Patent Group

(57) ABSTRACT

A wireless device (12A) is configured to determine, for each of one or more links (14), one or more characteristics associated with wireless device positioning performance on the link. In some embodiments, the one or more characteristics include one or more of: geometric dilution of precision, GDOP, characteristics associated with the link; or line-of-sight, LOS, characteristics or non-LOS characteristics of the link. Regardless, the wireless device (12A) may also be configured to transmit control signaling (22) indicating the one or more characteristics determined for each of the one or more links (14). Based on this control signaling
(Continued)

DETERMINE, FOR EACH OF ONE OR MORE LINKS, ONE OR MORE CHARACTERISTICS ASSOCIATED WITH WIRELESS DEVICE POSITIONING PERFORMANCE ON THE LINK
300

TRANSMIT CONTROL SIGNALING INDICATING THE ONE OR MORE CHARACTERISTICS DETERMINED FOR EACH OF THE ONE OR MORE LINKS
310

(22), a network node (16) may adapt positioning reference signal, PRS, configuration on at least one of the one or more links (14).

26 Claims, 27 Drawing Sheets

(58) Field of Classification Search
CPC ..... G01S 5/10; G01S 3/46; G01S 5/14; G01S 5/0221
See application file for complete search history.

(56) References Cited

U.S. PATENT DOCUMENTS

| | | |
|---|---|---|
| 2015/0296359 A1 | 10/2015 | Edge |
| 2015/0382318 A1 | 12/2015 | Kim et al. |
| 2017/0108579 A1 | 4/2017 | Irvine et al. |
| 2017/0332342 A1 | 11/2017 | Lu et al. |
| 2017/0339516 A1 | 11/2017 | Edge et al. |
| 2018/0035251 A1 | 2/2018 | Bitra |
| 2018/0063680 A1 | 3/2018 | Bitra et al. |

\* cited by examiner

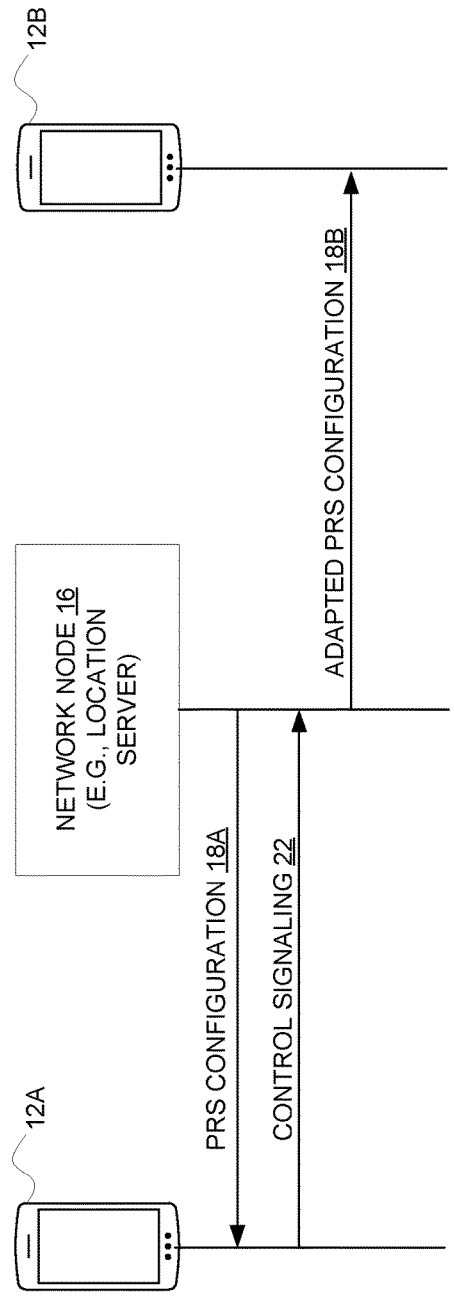
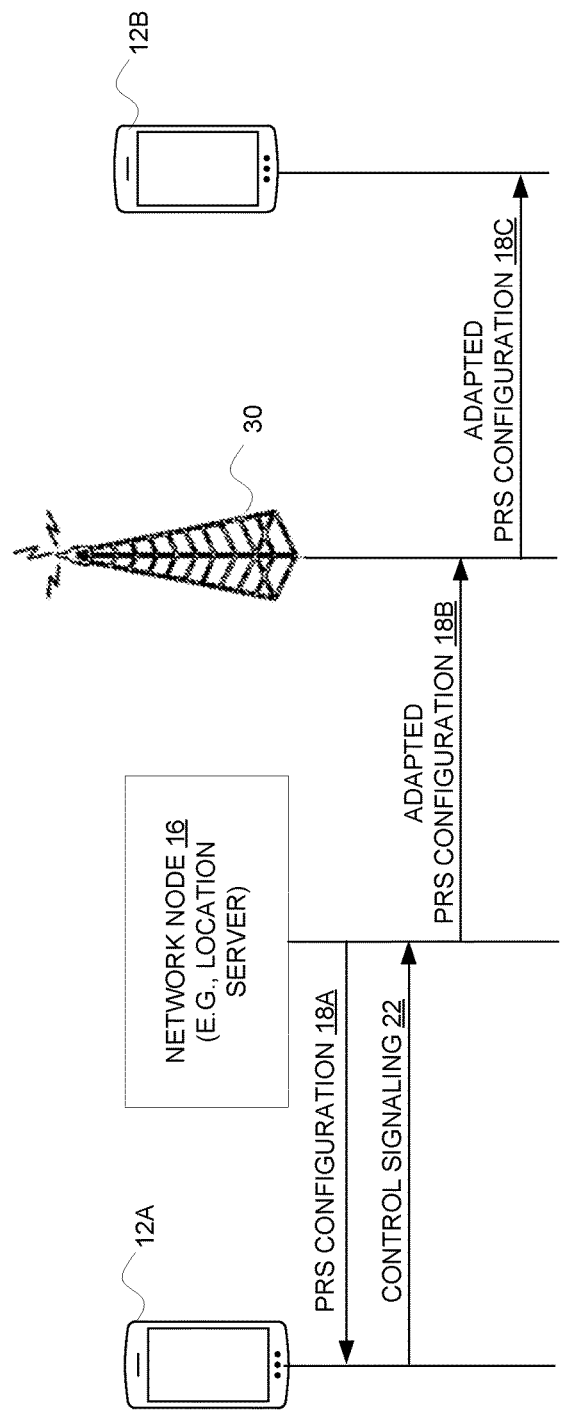

```
┌─────────────────────────────────────────┐
│ THE LOCATION SERVER RECEIVES AN         │
│ INDICATION OF THE UE CAPABILITY FOR     │
│ USING STATISTICS MEASUREMENT FROM       │
│ THE FIRST DEVICE.                       │
│ 1600                                    │
└─────────────────────────────────────────┘
                    │
                    ▼
┌─────────────────────────────────────────┐
│ THE LOCATION SERVER RECEIVES FROM THE   │
│ FIRST DEVICE ONE OR MORE QUALITY        │
│ CHARACTERISTICS FOR THE UE LOCATION     │
│ BASED ON RADIO SIGNALS FROM A SET OF    │
│ RADIO NETWORK NODES, BASED ON A FIRST   │
│ CONFIGURATION, AND/OR RECEIVES A        │
│ SECOND PRS CONFIGURATION SUGGESTED      │
│ BY THE UE.                              │
│ 1610                                    │
└─────────────────────────────────────────┘
                    │
                    ▼
┌─────────────────────────────────────────┐
│ THE LOCATION SERVER IDENTIFIES THAT THE │
│ PRS TRANSMISSION OF ONE OR MORE RADIO   │
│ NETWORK NODE IS NOT EFFICIENTLY         │
│ CONFIGURED AND ARE NOT CONTRIBUTING     │
│ TO THE UE POSITIONING ACCURACY.         │
│ 1620                                    │
└─────────────────────────────────────────┘
                    │
                    ▼
┌─────────────────────────────────────────┐
│ THE LOCATION SERVER SENDS A SECOND PRS  │
│ CONFIGURATION TO THOSE ONE OR MORE      │
│ RADIO NETWORK NODES                     │
│ 1630                                    │
└─────────────────────────────────────────┘
                    │
                    ▼
┌─────────────────────────────────────────┐
│ THE LOCATION SERVER SENDS THE THIRD PRS │
│ CONFIGURATIONS OF THOSE ONE OR MORE     │
│ RADIO NETWORK NODES TO THE SECOND       │
│ DEVICE, WHICH IS THE SAME AS OR BASED   │
│ ON THE SECOND PRS CONFIGURATION         │
│ 1640                                    │
└─────────────────────────────────────────┘
```

*FIGURE 16*

WIRELESS DEVICE POSITIONING

TECHNICAL FIELD

The present application relates generally to a wireless communication system, and relates more particularly to positioning of a wireless device in such a system.

BACKGROUND

Many techniques to determine the position of a wireless device in a wireless communication system rely on the wireless device to be able to detect signals from multiple base stations. For example, positioning techniques based on Reference Signal Time Difference (RSTD) require the wireless device to detect the times that respective signals from multiple base stations arrive at the wireless device. Although it is possible to measure the time of arrival of any type of signal, some types of signals in these circumstances suffer from poor hearability and therefore jeopardize positioning performance.

To address this, a so-called positioning reference signal (PRS) is a reference signal specifically designed and/or dedicated to be a signal on which a wireless device performs positioning measurements. A PRS may for instance have a wider range or deeper penetration into neighboring cells than other reference signals, so that PRS has improved hearability over other reference signals. This may be accomplished for instance using a pseudo-random Quadrature Phase Shift Keying (QPSK) sequence that is mapped in diagonal patterns with shift in frequency and time to avoid collision with other signals. Moreover, PRS can be muted on certain occasions to further reduce inter-cell interference.

To optimize positioning performance from PRS, then, each base station heretofore transmits PRS according to a pre-planned configuration and transmits the PRS all the time. The configuration may for instance be pre-planned to avoid inter-cell interference and increase hearability. Problematically, though, the pre-planned and always-on nature of PRS proves inefficient in terms of signalling overhead.

SUMMARY

Some embodiments herein facilitate adapting the configuration of a positioning reference signal (PRS) on a link, e.g., to account for or impact positioning performance on that link. For example, some embodiments stop transmitting PRS on a link if positioning performance on that link is poor. Alternatively or additionally, some embodiments transmit PRS on more radio resources on a link if positioning performance on that link is good. In these and other embodiments, positioning performance on a link may be represented or deduced from control signalling that a wireless device transmits to the network. To support PRS configuration adaptation, then, a wireless device according to some embodiments transmits control signalling that indicates one or more characteristics associated with positioning performance on a link. The characteristic(s) may for instance include geometric dilution of precision (GDOP) characteristics associated with the link, line-of-sight (LOS) characteristics of the link, and/or non-LOS characteristics of the link. In any event, adaptive PRS configuration according to some embodiments may advantageously avoid wasting radio resources on PRS transmissions that would not contribute to positioning performance, decrease energy consumption, and/or reduce signalling overhead for positioning.

More particularly, embodiments herein include a method performed by a wireless device. The method comprises determining, for each of one or more links, one or more characteristics associated with wireless device positioning performance on the link. In some embodiments, the one or more characteristics include one or more of: geometric dilution of precision (GDOP) characteristics associated with the link; or line-of-sight (LOS) characteristics or non-LOS characteristics of the link. Regardless, the method may also include transmitting control signaling indicating the one or more characteristics determined for each of the one or more links.

In some embodiments, the GDOP characteristics associated with the link include whether the link contributes to GDOP less than a GDOP threshold.

In some embodiments, the LOS characteristics or non-LOS characteristics of the link include whether the link has a probability of being in a LOS condition above a LOS probability threshold.

In some embodiments, the control signaling, for each of the one or more links, indicates or depends on an extent to which positioning reference signal, PRS, transmission on the link contributes to or detracts from accuracy of wireless device positioning.

In some embodiments, the control signaling indicates, for each of the one or more links, a statistical measure over time of at least one of the one or more characteristics.

In some embodiments, determining the one or more characteristics comprises determining the one or more characteristics for each of the one or more links by measuring a positioning reference signal, PRS, transmitted on the link according to a first PRS configuration. In one such embodiment, the method further comprises, after transmitting the control signaling, receiving from a location server a second PRS configuration different than the first PRS configuration according to which the wireless device is to monitor for or measure PRS on the link. In this case, the method may also comprise monitoring for or measuring PRS according to the second PRS configuration.

In some embodiments, determining the one or more characteristics comprises determining the LOS characteristics or non-LOS characteristics of each of the one or more links by correlating a positioning reference signal, PRS, transmitted on the link with a known PRS transmission.

Embodiments herein also include a method performed by a network node in a wireless communication network. The method comprises receiving control signaling that, for each of one or more links, indicates one or more characteristics associated with wireless device positioning performance on the link. In some embodiments, the one or more characteristics include one or more of: geometric dilution of precision (GDOP) characteristics associated with the link; or line-of-sight (LOS). characteristics or non-LOS characteristics of the link. Regardless, the method in some embodiments also includes, based on the received control signaling, adapting positioning reference signal, PRS, configuration on at least one of the one or more links.

In some embodiments, the GDOP characteristics associated with the link include whether the link contributes to GDOP less than a GDOP threshold.

In some embodiments, the LOS characteristics or non-LOS characteristics of the link include whether the link has a probability of being in a LOS condition above a LOS probability threshold.

In some embodiments, the control signaling, for each of the one or more links, indicates or depends on an extent to which positioning reference signal, PRS, transmission on the link contributes to or detracts from accuracy of wireless device positioning.

In some embodiments, the control signaling indicates, for each of the one or more links, a statistical measure over time of at least one of the one or more characteristics.

In some embodiments, adapting PRS configuration comprises adapting PRS configuration on at least one of the one or more links to transmit PRS on more radio resources on the at least one link or to reduce PRS frequency reuse, responsive to determining, based on the control signaling, that one or more of: wireless device positioning performance on the at least one link is less than a first performance threshold; at least one of the one or more characteristics is less than a first characteristic threshold; or PRS transmission on the at least one link contributes to accuracy of wireless device positioning less than a first threshold extent.

In some embodiments, adapting PRS configuration comprises adapting PRS configuration on at least one of the one or more links to transmit PRS on fewer radio resources on the at least one link or to increase PRS frequency reuse, responsive to determining, based on the control signaling, that: wireless device positioning performance on the at least one link is less than a second performance threshold; at least one of the one or more characteristics is less than a second characteristic threshold; or PRS transmission on the at least one link contributes to accuracy of wireless device positioning less than a second threshold extent.

In some embodiments, adapting PRS configuration comprises adapting PRS configuration on at least one of the one or more links to no longer transmit PRS on the at least one link, responsive to determining, based on the control signaling, that PRS transmission on the at least one link contributes to accuracy of wireless device positioning less than a third threshold extent, that wireless device positioning performance on the at least one link is less than a third performance threshold, or that at least one of the one or more characteristics is less than a third characteristic threshold.

In some embodiments, adapting PRS configuration comprises adapting PRS configuration on at least one of the one or more links to no longer transmit PRS on the at least one link, responsive to determining, based on the control signaling, that one or more of: the at least one link contributes to a geometric dilution of precision, GDOP, being higher than a GDOP threshold; or the at least one link has a probability of being in LOS condition below a LOS probability threshold.

In some embodiments, the network node is a location server and/or implements a location management function, LMF.

In some embodiments, adapting PRS configuration comprising determining an adapted configuration of the PRS transmission on the at least one link and transmitting the adapted configuration to a radio network node that serves the at least one link.

In some embodiments, the network node is a radio network node that serves at least one of the one or more links. In one such embodiment, the method further comprises transmitting control signaling to a location server indicating the adapted configuration of PRS transmission on at least one of the one or more links.

Embodiments herein also include corresponding apparatus, computer programs, and carriers (e.g., non-transitory computer-readable mediums). For example, embodiments herein include a wireless device. The wireless device is configured (e.g., via communication circuitry and processing circuitry) to determine, for each of one or more links, one or more characteristics associated with wireless device positioning performance on the link. In some embodiments, the one or more characteristics include one or more of: geometric dilution of precision (GDOP) characteristics associated with the link; or line-of-sight (LOS) characteristics or non-LOS characteristics of the link. Regardless, the wireless device may also be configured to transmit control signaling indicating the one or more characteristics determined for each of the one or more links.

Embodiments moreover include a network node configured for use in a wireless communication network. The network node is configured (e.g., via communication circuitry and processing circuitry) to receive control signaling that, for each of one or more links, indicates one or more characteristics associated with wireless device positioning performance on the link. In some embodiments, the one or more characteristics include one or more of: geometric dilution of precision (GDOP) characteristics associated with the link; or line-of-sight (LOS). characteristics or non-LOS characteristics of the link. Regardless, the network node in some embodiments is also configured to, based on the received control signaling, adapt positioning reference signal, PRS, configuration on at least one of the one or more links.

BRIEF DESCRIPTION OF THE DRAWINGS

FIG. 2A is a call flow diagram of a procedure for a network node to transmit an adapted PRS configuration to a wireless device according to some embodiments.

FIG. 2B is a call flow diagram of a procedure for a network node to transmit an adapted PRS configuration to a radio network node according to some embodiments.

FIG. 16 is a logic flow diagram of a method performed by a location server according to some embodiments.

DETAILED DESCRIPTION

Figure 1:
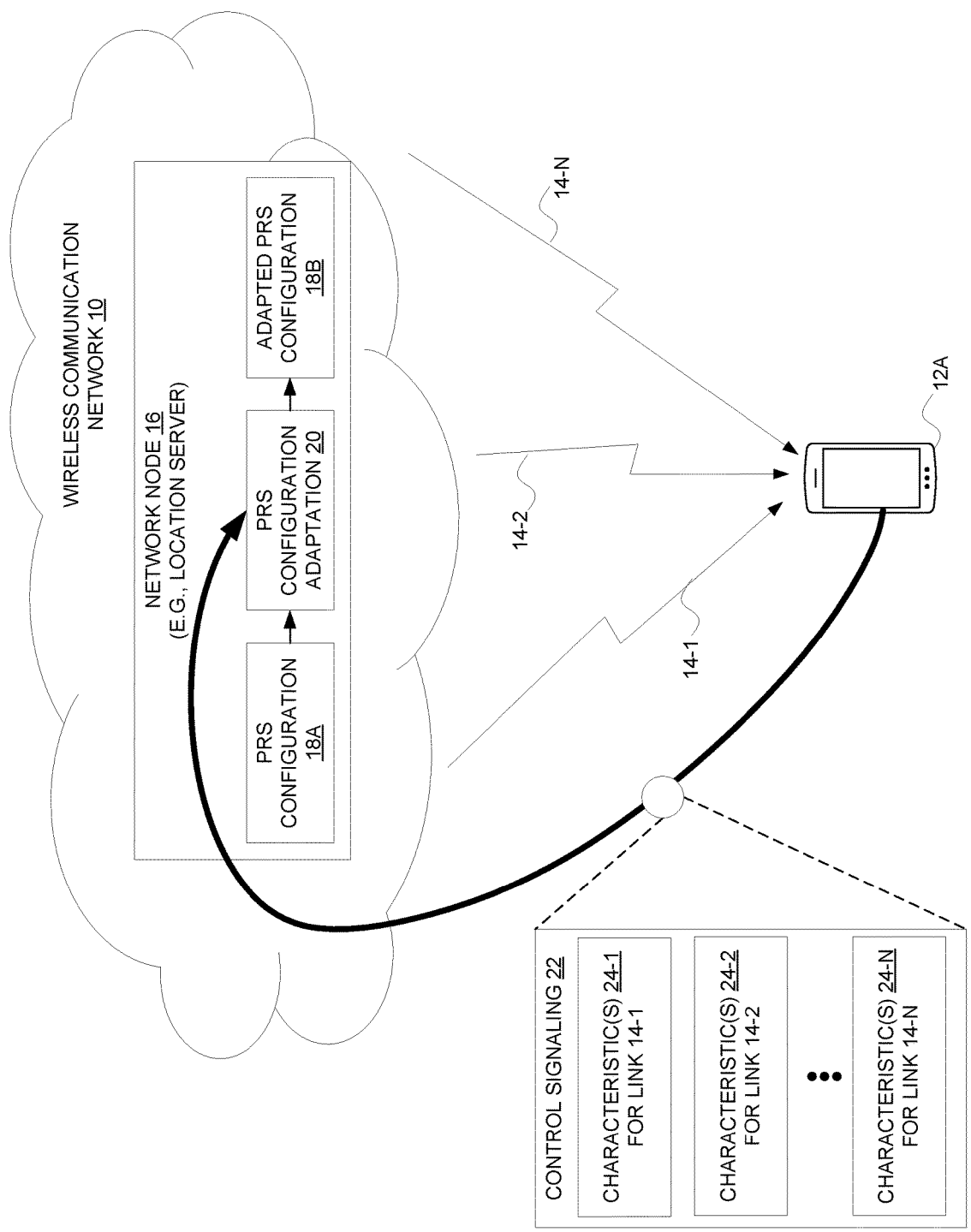
FIG. 1 is a block diagram of a wireless communication system according to some embodiments.

FIG. 1 shows a wireless communication network 10 (e.g., a 5G network) according to some embodiments. The network 10 provides radio access to wireless device 12A, 12B and connects the wireless devices 12A, 12B to one or more external data networks (not shown), such as the Internet. The network 10 in this regard provides links via which the wireless devices 12A, 12B may wirelessly access the network 10, e.g., using uplink and/or downlink communications. The network 10 may for example provide links 14-1, 14-2, . . . 14-N (generally links 14) in the form of cells, beams, radio network nodes, or the like. Some links 14 may provide wireless coverage over different geographical areas.

A network node 16 (e.g., a location server) in the wireless communication network 10 determines a configuration 18 of so-called positioning reference signals (PRSs) to be transmitted on one or more of the links 14. A PRS is a reference signal specifically designed and/or dedicated to be a signal on which a wireless device performs positioning measurements, i.e., measurements based on which the device's position is determined. A PRS may for instance have a wider range or deeper penetration than other reference signals, so that PRS has improved hearability over other reference signals. Regardless, the configuration 18 of PRS on a link may configure PRS in terms of on whether PRS is transmitted on the link, which and/or how many radio resources are used on the link for PRS transmission, PRS frequency resource, or the like.

Some embodiments herein facilitate adapting the PRS configuration 18 on a link. As shown, then, the network node 16 may perform PRS configuration adaptation 20 in order to determine or otherwise obtain an adapted PRS configuration 18B. The adapted PRS configuration 18B for a link may differ from the PRS configuration 18A for that link in terms of, e.g., whether PRS is transmitted on the link, which and/or how many radio resources are used on the link for PRS transmission, PRS frequency resource, or the like. In any event, the adaptation 20 in some embodiments may be performed on a dynamic or semi-static basis.

In fact, in some embodiments, PRS configuration adaptation 20 accounts for or impacts positioning performance on the one or more links 14. As used herein in this regard, positioning performance on a link refers to the performance of a positioning method that uses the link or to the positioning performance that is attributable to the link. PRS configuration adaptation 20 in some embodiments, then, accounts for the positioning performance that is attributable to the one or more links 14.

For example, some embodiments stop transmitting PRS on a link if positioning performance on (e.g., attributable to) that link is poor. Alternatively or additionally, some embodiments transmit PRS on more radio resources on a link if positioning performance on (e.g., attributable to) that link is good. PRS configuration adaptation 20 in these and other embodiments may advantageously avoid wasting radio resources on PRS transmissions that would not contribute to positioning performance, decrease energy consumption, and/or reduce signalling overhead for positioning.

In these and other embodiments, positioning performance on a link may be represented or deduced from control signalling that wireless device 12A transmits to the network node 16. To support PRS configuration adaptation 20, then, wireless device 12A according to some embodiments transmits control signalling 22 to or towards the network node 16. The control signalling 22 indicates, for each of the one or more links 14-1, 14-2, . . . 14-N, one or more characteristics 24 associated with wireless device positioning performance on the link. As used herein, one or more characteristics associated with wireless device positioning performance on a link refers to one or more characteristics associated with the link that describe, contribute to, or impact (i) the performance of a wireless device positioning method that uses the link; or (ii) wireless device positioning performance attributable to the link. FIG. 1 for instance shows that the control signalling 22 indicates one or more characteristics 24-1 for link 14-1, one or more characteristics 24-2 for link 14-2, and one or more characteristics 24-N for link 14-N. In some embodiments, the one or more characteristics 24 are associated with wireless device positioning performance on a link in the sense that the characteristic(s) 24 indicate or depend on an extent to which PRS transmission on the link contributes to or detracts from accuracy of wireless device positioning.

The characteristic(s) 24 indicated for a link may for instance include geometric dilution of precision (GDOP) characteristics associated with the link. GDOP describes error propagation as a mathematical effect that the topology of the PRS transmission points has on positioning measurement precision. A relatively wider angular separation between the PRS transmission points results in better positional precision, as reflected by a lower GDOP value. The relatively narrower angular separation between the PRS transmission points results in worse positioning precision, as reflected by a higher GDOP value. In some embodiments, then, the characteristic(s) 24 indicated by the control signalling 22 for a link may indicate the extent to which the link contributes to (i.e., helps provide) better or worse GDOP, e.g., the extent to which the link contributes to GDOP being less than a GDOP threshold or being greater than the same or a different GDOP threshold. For example, if PRS is transmitted on a link from a point that is geographically close to other points from which PRS is transmitted, the control signalling 22 may indicate that the link indeed contributes to GDOP being less than a GDOP threshold. But if PRS is transmitted on a link from a point that is geographically far from other points from which PRS is transmitted, the control signalling 22 may indicate that the link does not contribute to GDOP being less than a GDOP threshold and/or may actually contribute to GDOP being above the same or a different GDOP threshold. As one concrete example, GDOP values above ten (10) may indicate that there is at least one unreliable or poor quality link contributing to total positioning accuracy.

Alternatively or additionally, the characteristic(s) 24 indicated for a link may include line-of-sight (LOS) characteristics of the link and/or non-LOS characteristics of the link. LOS characteristics of a link in this sense refer to characteristics that indicate an extent to which the link provides a LOS path between a PRS transmission point and the wireless device 12A. Conversely, non-LOS characteristics of a link refer to characteristics that indicate an extent to which the link provides a non-LOS path between a PRS transmission point and the wireless device 12A. In either case, the LOS characteristics or non-LOS characteristics of a link may for instance include whether the link has a probability of being in a LOS condition above a LOS probability threshold. In some embodiments, for example, the LOS characteristics or non-LOS characteristics of a link may be the extent to which a PRS transmitted on the link correlates with a known PRS transmission. Indeed, the higher the correlation, the higher the probability that the link provides a LOS path, e.g., with fewer reflections to distort the PRS transmission.

In still other embodiments, the characteristic(s) 24 for a link may include a signal quality or strength of PRS transmitted on the link, such as a received signal quality, Es/Iot, signal-to-interference-plus-noise-ratio (SINR), reference signal received quality (RSRQ), channel state information (CSI), etc. Alternatively or additionally, the characteristic(s) 24 for a link may include channel characteristics of the link and/or statistical accuracy or performance of wireless device positioning on the link.

No matter the particular type of characteristic(s) 24 indicated for each link 14, though, at least one of the characteristic(s) 24 in some embodiments may indicate a statistical measure over time. Such a statistical measure may for instance be a measure of an average, Xth percentile, median, or the like of a certain characteristic. For example, a characteristic 24 for a link may indicate whether, on average, over a given time frame, the link contributes to GDOP being less than a GDOP threshold. Or, a characteristic 24 for a link may indicate whether, on average, over a given time frame, the link has a probability of being in a LOS condition above a LOS probability threshold.

In any event, the wireless device 12A in some embodiments determines the characteristic(s) 24 for each of the one or more links 14 by measuring PRS transmitted on the link, e.g., according to PRS configuration 18A, also referred to as a first PRS configuration 18A. For example, in one such embodiment PRS is transmitted on the link(s) 14 according to PRS configuration 18A, and the wireless device 12A generates the control signaling 22 based on measurement of such PRS. In this case, then, the control signaling 22 may directly reflect positioning performance attributable to the PRS configuration 18A, so that PRS configuration adaptation 20 may be dynamically performed to account for or impact that positioning performance.

In fact, in some embodiments, the network node 16 may receive the same sort of control 22 signaling from one or more other wireless devices (not shown) in the network 10, e.g., indicating characteristic(s) associated with positioning performance on each link 14 from the other wireless device(s)' perspectives as well. The network node's PRS configuration adaptation 20 in this case may generally be based on the control signaling 22 received from one or more wireless devices. For example, the PRS configuration adaptation 20 may be based on what the control signaling 22 indicates about the positioning performance on each link 14 as viewed from the perspective of a certain number or percentage of wireless devices, i.e., which may be more than just a single wireless device 12A.

The network node 16 in some embodiments, for instance, may determine whether the control signaling 22 from one or more wireless devices indicates that wireless device positioning performance on a link is less than a first performance threshold, e.g., for N1 wireless devices (N1=1, 2, . . . ) or Y1% of wireless devices, where N1 and Y1 may be predefined or configured. Or, the network node 16 may determine whether PRS transmission on the link contributes to accuracy of positioning less than a first threshold extent, e.g., for N1 wireless devices or Y1% of wireless devices. Or, the network node 16 may determine whether at least one of the characteristic(s) 24 indicated for the link is less than a first characteristic threshold, e.g., for N1 wireless devices or Y1% of wireless devices. If the network node 16 determines that any of these is the case, the network node 16 may adapt PRS configuration on the link to transmit PRS on more radio resources on the link, e.g., by transmitting PRS on more radio resources in time, frequency, space, and/or code. The network node 16 may for instance do so by increasing PRS bandwidth on the link, PRS density on the link, the number of PRS resource elements within a resource block and/or subframe of the link, the number of PRS subframes per positioning occasion on the link, or the like. Alternatively or additionally, the network node 16 may reduce PRS frequency reuse, e.g., so as to reduce interference affecting positioning on the link. Adapting PRS configuration in these or other ways may dynamically improve positioning performance on a link, e.g., so that resources are not wasted on transmitting PRS on a link that does not meaningfully contribute to positioning performance.

On the other hand, the network node 16 in other embodiments may decide to simply stop transmitting PRS on a link under some circumstances, rather than attempting to improve positioning performance on that link. In some embodiments, for example, the network node 16 may adapt PRS configuration on a link to no longer transmit PRS on the link. The network node 16 may for instance do this responsive to determining that PRS transmission on the link contributes to accuracy of positioning less than a third threshold extent, e.g., for N3 wireless devices or Y3% of wireless devices. Or, the network node 16 may do this responsive to determining that positioning performance on the link is less than a third performance threshold, e.g., for N3 wireless devices or Y3% of wireless devices. Or, in still other embodiments, the network node 16 may do this responsive to determining that at least one of the characteristic(s) 24 is less than a third characteristic threshold, e.g., for N3 wireless devices or Y3% of wireless devices. In some embodiments, for example, the network node 16 may stop transmitting PRS on a link if the link contributes to GDOP being higher than a GDOP threshold; that is, if the link contributes to worse GDOP. Alternatively or additionally, the network node 16 may stop transmitting PRS on a link if the link has a probability of being in a LOS condition below a LOS probability threshold.

Conversely, the network node 16 in some embodiments may determine whether the control signaling 22 from one or more wireless devices indicates that wireless device positioning performance on a link is more than a second performance threshold, e.g., for N2 wireless devices (N2=1, 2, . . . ) or Y2% of wireless devices, where N2 and Y2 may be predefined or configured. Or, the network node 16 may determine whether PRS transmission on the link contributes to accuracy of positioning more than a second threshold extent. If the network node 16 determines that either is the case, the network node 16 may adapt PRS configuration on the link to transmit PRS on fewer radio resources on the link, e.g., by transmitting PRS on fewer radio resources in time, frequency, space, and/or code. The network node 16 may for instance do so by decreasing PRS bandwidth on the link, PRS density on the link, the number of PRS resource elements within a resource block and/or subframe of the link, the number of PRS subframes per positioning occasion on the link, or the like. Alternatively or additionally, the network node 16 may increase PRS frequency reuse, e.g., so as to allow more interference affecting positioning on the link. Adapting PRS configuration in these or other ways may dynamically optimize positioning performance on a link, e.g., so that resources are not wasted on transmitting PRS on a link in a way that provides higher positioning performance than needed or that does not in any event improve overall positioning performance (given the performance provided by other links).

Note that in some embodiments the PRS configuration adaptation 20 may directly benefit or otherwise impact the same wireless device 12A that transmits the control signaling 22 on which the adaptation 20 is based. In this case, the wireless device 12A may receive the adapted PRS configuration 18B from the network node 16. The wireless device 12A may then monitor for or measure PRS on one or more links (which may be the same as or different from links 14), according to the adapted PRS configuration 18B. In other embodiments, though, PRS configuration adaptation 20 may benefit or otherwise impact a different wireless device (which may be referred to a second wireless device). In these latter embodiments, then, the PRS that is transmitted on the link(s) according to the adapted PRS configuration 18B may be received and measured by a different wireless device.

Note further that, in some embodiments, the network node 16 transmits the adapted PRS configuration 18B directly to the wireless device 12A or a different wireless device. FIG. 2A shows one such embodiment. In this case, the network node 16 transmits the PRS configuration 18A to wireless device 12A and thereafter receives control signaling 22 from that wireless device 12A. Based on the control signaling 22, the network node 16 adapts the PRS configuration and transmits the adapted PRS configuration 18B to wireless device 12B. In other embodiments, by contrast, the network node 16 transmits the adapted PRS configuration 18B to a radio network node (e.g., a base station). FIG. 2B shows this embodiment. As shown, the network node 16 transmits adapted PRS configuration 18B (also referred to as a second PRS configuration) to a radio network node 30. The radio network node 30 then transmits adapted PRS configuration 18C to wireless device 12B. This adapted PRS configuration 18C (also referred to as a third PRS configuration) may be the same as or different from adapted PRS configuration 18B. Indeed, the radio network node 30 in some embodiments may autonomously decide on the actual PRS configuration according to which its PRS transmission is to be based. If the radio network node 30 changes the adapted PRS configuration 18B, the radio network node 30 may signal such change to the network node 16 (not shown).

Figure 3:
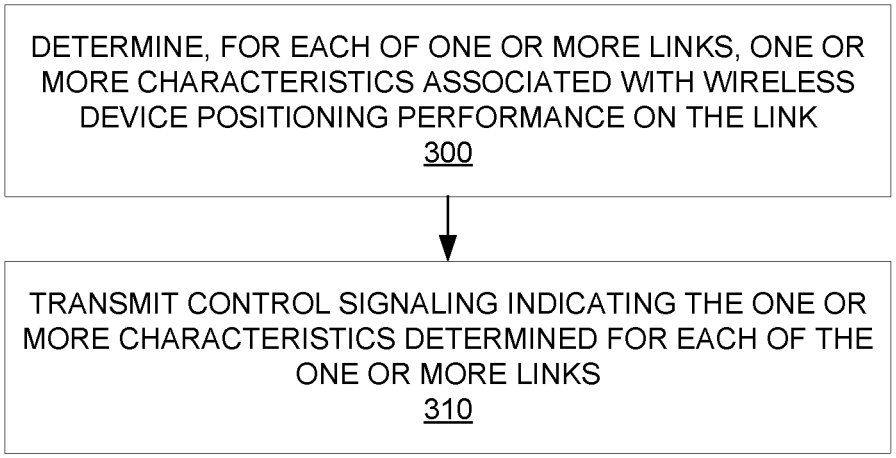
FIG. 3 is a logic flow diagram of a method performed by a wireless device according to some embodiments.

In view of the above modifications and variations, FIG. 3 depicts a method performed by a wireless device 12A in accordance with particular embodiments. The method includes determining, for each of one or more links 14, one or more characteristics associated with wireless device positioning performance on the link (block 300). The method also includes transmitting control signaling 22 indicating the one or more characteristics determined for each of the one or more links 14 (block 310).

In some embodiments, the one or more characteristics include one or more of: geometric dilution of precision (GDOP) characteristics associated with the link; or line-of-sight (LOS) characteristics or non-LOS characteristics of the link. For example, the GDOP characteristics associated with the link may include whether the link contributes to GDOP less than a GDOP threshold. The LOS characteristics or non-LOS characteristics of the link may include whether the link has a probability of being in a LOS condition above a LOS probability threshold. In these and other cases, determining the LOS characteristics or non-LOS characteristics of each of the one or more links may involve correlating a positioning reference signal, PRS, transmitted on the link with a known PRS transmission.

In some embodiments, the control signalling 22, for each of the one or more links 14, indicates or depends on an extent to which PRS transmission on the link contributes to or detracts from accuracy of wireless device positioning.

Alternatively or additionally, the control signalling 22, for each of the one or more links 14, may indicate whether: the link provides geometric dilution of precision (GDOP) less than a GDOP threshold; the link has reference signal time difference (RSTD) quality above an RSTD threshold; and the link has a probability of being in line of sight (LOS) condition above a LOS probability threshold.

In some embodiments, for each of the one or more links 14, the one or more characteristics include a signal quality or strength of PRS transmitted on the link.

In some embodiments, for each of the one or more links 14, the one or more characteristics include geometric dilution of precision, GDOP, on the link.

In some embodiments, for each of the one or more links 14, the one or more characteristics include channel characteristics of the link, line-of-sight, LOS characteristics of the link, or non-LOS characteristics of the link.

In some embodiments, for each of the one or more links 14, the one or more characteristics include correlation of a PRS transmission on the link with a known PRS transmission.

In some embodiments, the control signaling 22 indicates, for each of the one or more links, a statistical measure over time of at least one of the one or more characteristics.

In some embodiments, for each of at least one of the one or more quality characteristics, the control signaling 22 for a link indicates whether the link is contributing to that characteristic being below a threshold.

In some embodiments, for each of the one or more links 14, the one or more characteristics include a statistical measure over time of positioning quality or uncertainty.

In some embodiments, for each of the one or more links 14, the control signaling 22 indicates a suggestion of or preference for one or more PRS transmission parameters on the link. In one such embodiment, the one or more PRS transmission parameters include a suggestion of or preference for radio resources in which to transmit PRS on the link. Alternatively or additionally, in one embodiment, the one or more PRS transmission parameters include a suggestion of or preference for a PRS bandwidth, a number or density of PRS subframes, and/or a number or density of PRS frames in which to transmit PRS on the link.

In some embodiments, said transmitting comprises transmitting the control signaling 22 to a network node 16. In one such embodiment, the network node 16 is a location server or a positioning server. In another embodiment, the network node 16 implements a location management function, LMF.

In other embodiments, said transmitting comprises transmitting the control signaling 22 to a radio network node 30.

In some embodiments, each of the one or more links 14 is a radio network node, a cell, or a beam.

In some embodiments, the control signaling 22, for each of the one or more links 14, indicates statistical accuracy or performance of wireless device positioning on the link.

In some embodiments, said determining comprises determining the one or more characteristics for each of the one or more links by measuring PRS transmitted on the link according to a first PRS configuration. In one such embodiment, the method may further comprise, after transmitting the control signaling 22, receiving from a location server a second PRS configuration different than the first PRS configuration according to which the wireless device 12A is to monitor for or measure PRS on the link. In this case, the method may further comprise monitoring for or measuring PRS according to the second PRS configuration.

In some embodiments, the method further comprises transmitting capability signaling indicating a capability of the wireless device 12A to transmit said control signaling 22.

Figure 4:
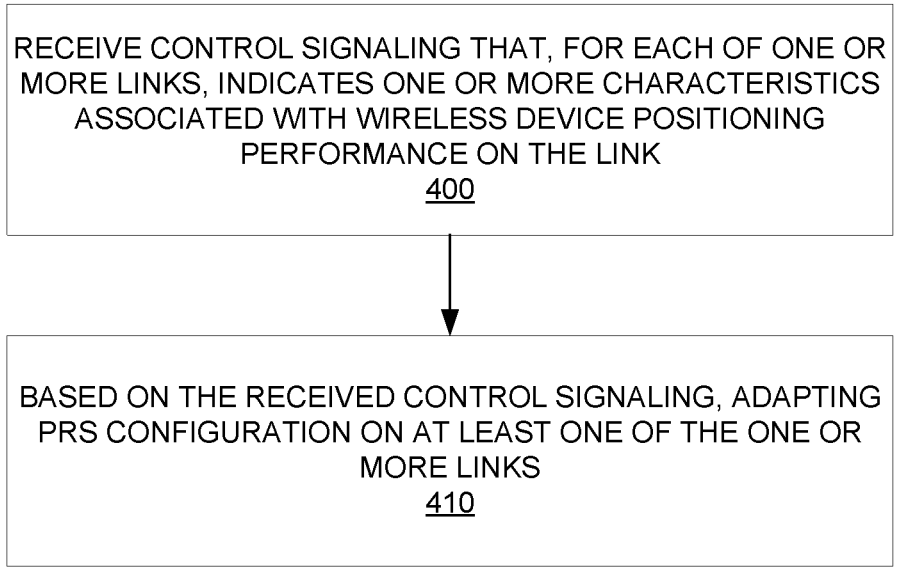
FIG. 4 is a logic flow diagram of a method performed by a network node according to some embodiments.

FIG. 4 depicts another method by a network node 16 in accordance with other particular embodiments. The method includes receiving control signaling 22 that, for each of one or more links 14, indicates one or more characteristics associated with wireless device positioning performance on the link (block 400). The method further includes, based on the received control signaling 22, adapting PRS configuration on at least one of the one or more links (block 410).

In some embodiments, the one or more characteristics include one or more of: geometric dilution of precision (GDOP) characteristics associated with the link; or line-of-sight (LOS) characteristics or non-LOS characteristics of the link. For example, the GDOP characteristics associated with the link may include whether the link contributes to GDOP less than a GDOP threshold. The LOS characteristics or non-LOS characteristics of the link may include whether the link has a probability of being in a LOS condition above a LOS probability threshold.

In some embodiments, the control signalling 22, for each of the one or more links 14, indicates or depends on an extent to which PRS transmission on the link contributes to or detracts from accuracy of wireless device positioning.

In some embodiments, said adapting comprises adapting PRS configuration on at least one of the one or more links to transmit PRS on more radio resources on the at least one link or to reduce PRS frequency reuse, responsive to determining, based on the control signaling, that wireless device positioning performance on the at least one link is less than a first performance threshold or that at least one of the one or more characteristics is less than a first characteristic threshold.

In some embodiments, said adapting comprises adapting PRS configuration on at least one of the one or more links to transmit PRS on more radio resources on the at least one link or to reduce PRS frequency reuse, responsive to determining, based on the control signaling, that PRS transmission on the at least one link contributes to accuracy of wireless device positioning less than a first threshold extent.

In some embodiments, adapting PRS configuration on at least one of the one or more links to transmit PRS on more radio resources on the at least one link comprises adapting PRS configuration on at least one of the one or more links to transmit PRS on the at least one link over a larger frequency bandwidth, with a higher density in time and/o/r frequency, on a larger number of PRS resource elements within a resource block and/or subframe, and/or within a larger number of PRS subframes per positioning occasion.

In some embodiments, said adapting comprises adapting PRS configuration on at least one of the one or more links to transmit PRS on fewer radio resources on the at least one link or to increase PRS frequency reuse, responsive to determining, based on the control signaling, that wireless device positioning performance on the at least one link is less than a second performance threshold or that at least one of the one or more characteristics is less than a second characteristic threshold.

In some embodiments, said adapting comprises adapting PRS configuration on at least one of the one or more links to transmit PRS on fewer radio resources on the at least one link or to increase PRS frequency reuse, responsive to determining, based on the control signaling, that PRS transmission on the at least one link contributes to accuracy of wireless device positioning less than a second threshold extent.

In some embodiments, adapting PRS configuration on at least one of the one or more links to transmit PRS on fewer radio resources on the at least one link comprises adapting PRS configuration on at least one of the one or more links to transmit PRS on the at least one link over a smaller frequency bandwidth, with a smaller density in time and/o/r frequency, on a smaller number of PRS resource elements within a resource block and/or subframe, and/or within a smaller number of PRS subframes per positioning occasion.

In some embodiments, said adapting comprises adapting PRS configuration on at least one of the one or more links to no longer transmit PRS on the at least one link, responsive to determining, based on the control signaling, that PRS transmission on the at least one link contributes to accuracy of wireless device positioning less than a second threshold extent, that wireless device positioning performance on the at least one link is less than a second performance threshold, or that at least one of the one or more characteristics is less than a second characteristic threshold.

In some embodiments, said adapting comprises adapting PRS configuration on at least one of the one or more links to no longer transmit PRS on the at least one link, responsive to determining, based on the control signaling, that one or more of: (i) the at least one link provides geometric dilution of precision, GDOP, less than a GDOP threshold; (ii) the at least one link has reference signal time difference, RSTD, quality above an RSTD threshold; and (iii) the at least one link has a probability of being in LOS condition above a LOS probability threshold.

In some embodiments, for each of the one or more links 14, the one or more characteristics include a signal quality or strength of the PRS transmitted on the link.

In some embodiments, for each of the one or more links, the one or more characteristics include geometric dilution of precision, GDOP, on the link.

In some embodiments, for each of the one or more links 14, the one or more characteristics include channel characteristics of the link, line-of-sight, LOS characteristics of the link, or non-LOS characteristics of the link.

In some embodiments, for each of the one or more links 14, the one or more characteristics include correlation of a PRS transmission on the link with a known PRS transmission.

In some embodiments, the control signaling 22 indicates, for each of the one or more links 14, a statistical measure over time of at least one of the one or more characteristics.

In some embodiments, for each of at least one of the one or more quality characteristics, the control signaling 22 for a link indicates whether the link is contributing to that characteristic being below a threshold.

In some embodiments, for each of the one or more links 14, the one or more characteristics include a statistical measure over time of positioning quality or uncertainty.

In some embodiments, for each of the one or more links 14, the control signaling 22 indicates a suggestion of or preference for one or more PRS transmission parameters on the link. In one such embodiment, the one or more PRS transmission parameters include a suggestion of or preference for radio resources in which to transmit PRS on the link. Alternatively or additionally, in one embodiment, the one or more PRS transmission parameters include a suggestion of or preference for a PRS bandwidth, a number or density of PRS subframes, and/or a number or density of PRS frames in which to transmit PRS on the link.

In some embodiments, the network node 16 is a location server.

In some embodiments, the network node 16 implements a location management function, LMF.

In some embodiments, said adapting comprising determining an adapted configuration of the PRS transmission on the at least one link and transmitting the adapted configuration to a radio network node that serves the at least one link.

In some embodiments, the network node 16 is a radio network node that serves at least one of the one or more links. In one such embodiment, the method further comprises transmitting control signaling to a location server indicating the adapted configuration of PRS transmission on at least one of the one or more links.

In some embodiments, each of the one or more links 14 is a radio network node, a cell, or a beam.

In some embodiments, the control signaling 22, for each of the one or more links 14, indicates statistical accuracy or performance of wireless device positioning on the link.

In some embodiments, the control signaling 22 is received from a wireless device 12A served on at least one of the one or more links.

Figure 5:
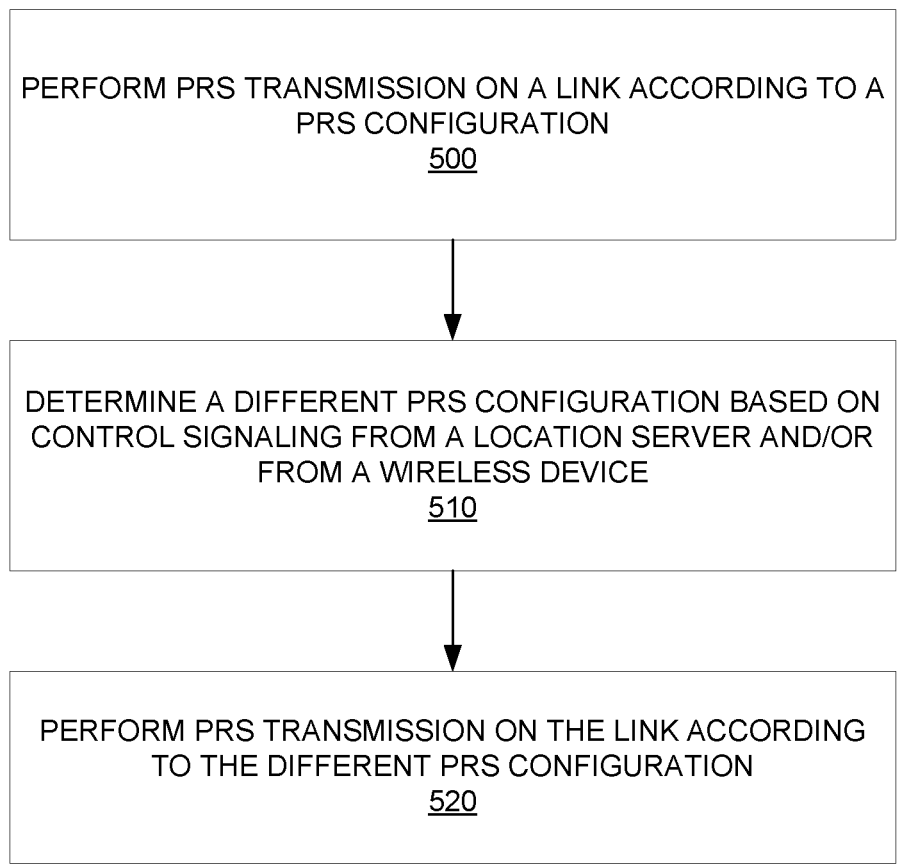
FIG. 5 is a logic flow diagram of a method performed by a radio network node according to some embodiments.

FIG. 5 depicts a method by a radio network node 30 in accordance with particular embodiments. The method includes performing PRS transmission on a link according to a PRS configuration (block 500) and determining a different PRS configuration based on control signaling from a location server and/or from a wireless device (block 510). The method further includes performing PRS transmission on the link according to the different PRS configuration (block 520).

In some embodiments, said determining comprises determining the different PRS configuration based on control signaling from the location server.

In some embodiments, the control signaling form the location server indicates the different PRS configuration.

In some embodiments, said determining comprises determining the different PRS configuration based on control signaling from the wireless device.

In some embodiments, the control signaling from the wireless device indicates, for each of one or more links, one or more characteristics associated with wireless device positioning performance on the link.

In some embodiments, the control signaling, for each of the one or more links, indicates or depends on an extent to which PRS transmission on the link contributes to or detracts from accuracy of wireless device positioning.

In some embodiments, for each of the one or more links, the one or more characteristics include a signal quality or strength of the PRS transmitted on the link. Alternatively or additionally, for each of the one or more links, the one or more characteristics include geometric dilution of precision, GDOP, on the link.

In some embodiments, for each of the one or more links, the one or more characteristics include channel characteristics of the link, line-of-sight, LOS characteristics of the link, or non-LOS characteristics of the link.

In some embodiments, for each of the one or more links, the one or more characteristics include correlation of a PRS transmission on the link with a known PRS transmission.

In some embodiments, the control signaling indicates, for each of the one or more links, a statistical measure over time of at least one of the one or more characteristics.

In some embodiments, for each of at least one of the one or more quality characteristics, the control signaling for a link indicates whether the link is contributing to that characteristic being below a threshold.

In some embodiments, for each of the one or more links, the one or more characteristics include a statistical measure over time of positioning quality or uncertainty.

In some embodiments, for each of the one or more links, the control signaling indicates a suggestion of or preference for one or more PRS transmission parameters on the link. In one such embodiment, the one or more PRS transmission parameters include a suggestion of or preference for radio resources in which to transmit PRS on the link. Alternatively or additionally, in one embodiment, the one or more PRS transmission parameters include a suggestion of or preference for a PRS bandwidth, a number or density of PRS subframes, and/or a number or density of PRS frames in which to transmit PRS on the link.

In some embodiments, the method further comprises transmitting control signaling to a location server indicating the different PRS configuration.

In some embodiments, each of the one or more links is a radio network node, a cell, or a beam.

In some embodiments, the control signaling, for each of the one or more links, indicates statistical accuracy or performance of wireless device positioning on the link.

Figure 6:
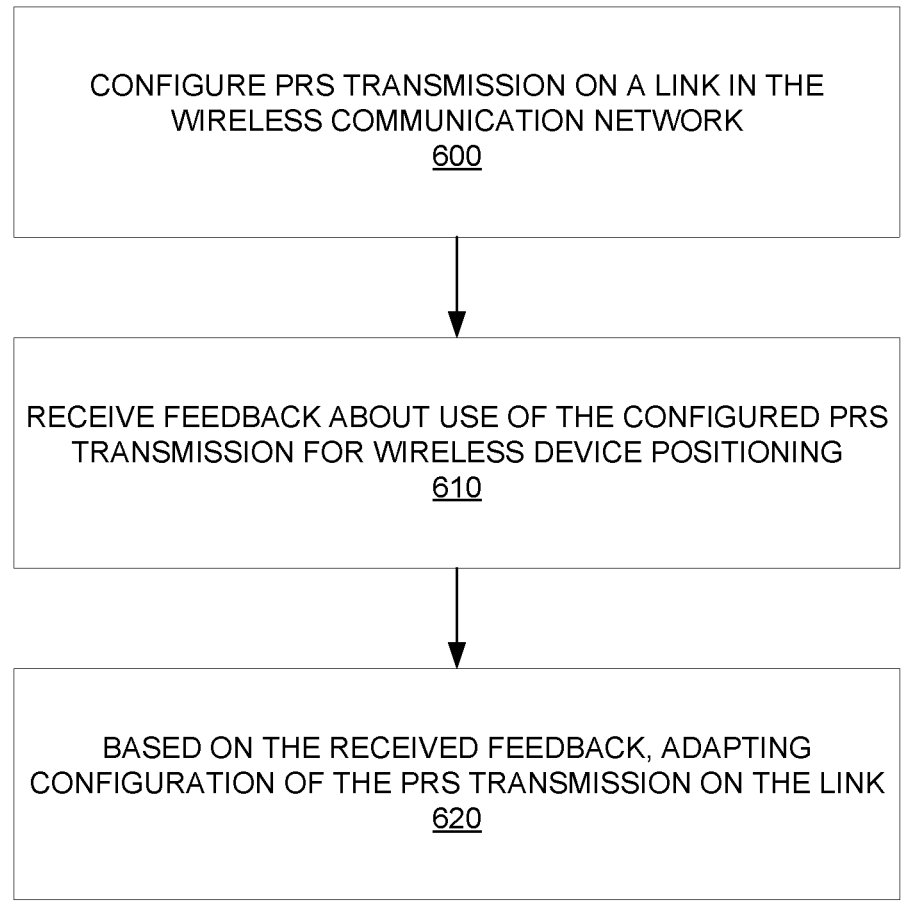
FIG. 6 is a logic flow diagram of a method performed by a network node according to other embodiments.

FIG. 6 depicts a method by a network node in accordance with particular embodiments. The network node may be a radio network node, a location server or a positioning server. The method includes configuring PRS transmission on a link in the wireless communication network (block 600) and receiving feedback about use of the configured PRS transmission for wireless device positioning (block 610). In some embodiments, the feedback indicates or depends on an extent to which the PRS transmission on the link contributes to or detracts from accuracy of wireless device positioning. Regardless, the method also includes, based on the received feedback, adapting configuration of the PRS transmission on the link (block 620).

In some embodiments, said adapting comprises configuring PRS to be transmitted on more radio resources on the link or reducing PRS frequency reuse, responsive to determining, based on the feedback, that the PRS transmission on the link contributes to accuracy of wireless device positioning less than a first threshold extent. In one such embodiment, configuring PRS to be transmitted on more radio resources on the link comprises configuring PRS to be transmitted on the link over a larger frequency bandwidth, with a higher density in time and/o/r frequency, on a larger number of PRS resource elements within a resource block and/or subframe, and/or within a larger number of PRS subframes per positioning occasion.

In other embodiments, said adapting comprises configuring PRS to be transmitted on fewer radio resources on the link or increasing PRS frequency reuse, responsive to determining, based on the feedback, that the PRS transmission on the link contributes to accuracy of wireless device positioning less than a second threshold extent or that the PRS transmission on the link detracts from accuracy of wireless device positioning. In one such embodiment, configuring PRS to be transmitted on fewer radio resources on the link comprises configuring PRS to be transmitted on the link over a smaller frequency bandwidth, with a smaller density in time and/o/r frequency, on a smaller number of PRS resource elements within a resource block and/or subframe, and/or within a smaller number of PRS subframes per positioning occasion.

In still other embodiments, said adapting comprises configuring PRS to no longer be transmitted on the link, responsive to determining, based on the feedback, that the PRS transmission on the link contributes to accuracy of wireless device positioning less than a minimum extent or that the PRS transmission on the link detracts from accuracy of wireless device positioning. For example, in one embodiment, the method further comprises determining, based on the feedback, that the PRS transmission on the link contributes to accuracy of wireless device positioning less than a minimum extent or that the PRS transmission on the link detracts from accuracy of wireless device positioning based on determining that one or more of: the link provides geometric dilution of precision, GDOP, less than a GDOP threshold; the link has reference signal time difference, RSTD, quality above an RSTD threshold; and the link has a probability of being in LOS condition above a LOS probability threshold.

In some embodiments, the feedback indicates or depends on one or more quality characteristics for wireless device positioning based on the configured PRS transmission. In one such embodiment, the one or more quality characteristics include a signal quality or strength of the configured PRS transmission. Alternatively or additionally, the one or more quality characteristics include geometric dilution of precision, GDOP. Alternatively or additionally, the one or more quality characteristics include line-of-sight, LOS, or non-LOS characteristics, of the configured PRS transmission. Alternatively or additionally, the one or more quality characteristics include correlation of the configured PRS transmission with a known PRS transmission. Alternatively or additionally, for each of at least one of the one or more quality characteristics, the feedback indicates a statistical measure over time of that quality characteristic. Alternatively or additionally, for each of at least one of the one or more quality characteristics, the feedback indicates whether the link is contributing to that quality characteristic being below a threshold.

In some embodiments, the feedback indicates a statistical measure over time of positioning quality or uncertainty.

In some embodiments, the feedback indicates a suggestion of or preference for one or more PRS transmission parameters on the link. In one such embodiment, the one or more PRS transmission parameters include a suggestion of or preference for radio resources in which to transmit PRS on the link. Alternatively or additionally, the one or more PRS transmission parameters include a suggestion of or preference for a PRS bandwidth, a number or density of PRS subframes, and/or a number or density of PRS frames in which to transmit PRS on the link.

In some embodiments, the network node is a location server.

In some embodiments, the network node implements a location management function, LMF.

In some embodiments, said adapting comprising determining an adapted configuration of the PRS transmission on the link and transmitting the adapted configuration to a radio network node that serves the link.

In some embodiments, the network node is a radio network node that serves at least one of the one or more links. In this case, they method may further comprise transmitting control signaling to a location server indicating the adapted configuration of PRS transmission on the link.

In some embodiments, the link is a radio network node, a cell, or a beam.

In some embodiments, the feedback indicates statistical accuracy or performance of wireless device positioning based on the configured PRS transmission on the link.

In some embodiments, the feedback indicates one or more characteristics associated with wireless device positioning performance on the link.

In some embodiments, the feedback is received from a wireless device served on the link.

Embodiments also include corresponding apparatus, wireless devices, radio network nodes, location servers, radio network nodes, computer programs, and carriers (e.g., computer-readable mediums).

Embodiments also include a wireless device 12A comprising processing circuitry and power supply circuitry. The processing circuitry is configured to perform any of the steps of any of the embodiments described above for the wireless device 12A. The power supply circuitry is configured to supply power to the wireless device 12A.

Embodiments further include a wireless device 12A comprising processing circuitry. The processing circuitry is configured to perform any of the steps of any of the embodiments described above for the wireless device 12A. In some embodiments, the wireless device 12A further comprises communication circuitry.

Embodiments further include a wireless device 12A comprising processing circuitry and memory. The memory contains instructions executable by the processing circuitry whereby the wireless device 12A is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

Embodiments herein also include a network node 16 configured to perform any of the steps of any of the embodiments described above for the network node.

Embodiments also include a network node 16 comprising processing circuitry and power supply circuitry. The processing circuitry is configured to perform any of the steps of any of the embodiments described above for the network node 16. The power supply circuitry is configured to supply power to the network node 16.

Embodiments further include a network node 16 comprising processing circuitry. The processing circuitry is configured to perform any of the steps of any of the embodiments described above for the network node 16. In some embodiments, the network node 16 further comprises communication circuitry.

Embodiments further include a network node 16 comprising processing circuitry and memory. The memory contains instructions executable by the processing circuitry whereby the network node 16 is configured to perform any of the steps of any of the embodiments described above for the network node 16.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
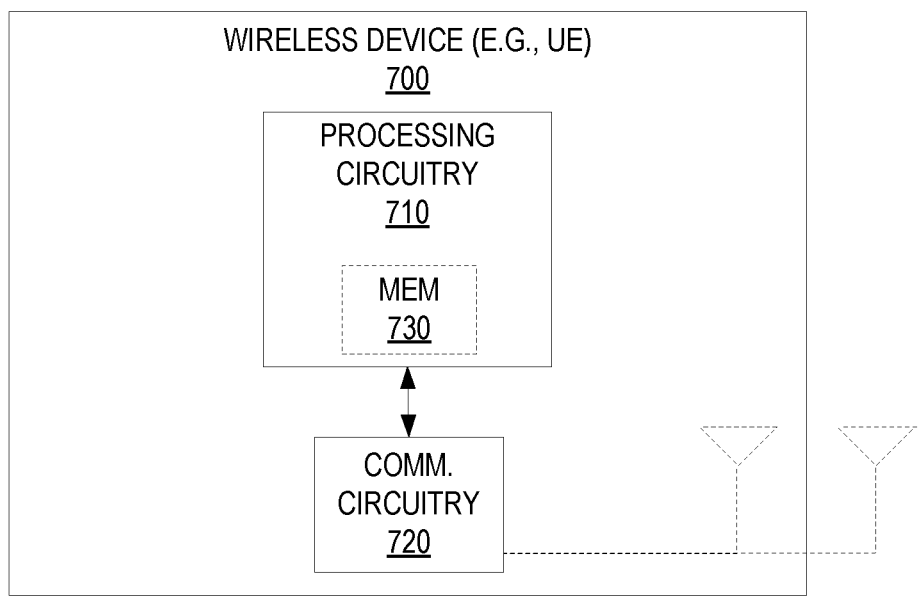
FIG. 7 is a block diagram of a wireless device according to some embodiments.

FIG. 7 for example illustrates a wireless device 700 (e.g., wireless device 12A) as implemented in accordance with one or more embodiments. As shown, the wireless device 700 includes processing circuitry 710 and communication circuitry 720. The communication circuitry 720 (e.g., radio circuitry) is configured to transmit and/or receive information to and/or from one or more other nodes, e.g., via any communication technology. Such communication may occur via one or more antennas that are either internal or external to the wireless device 700. The processing circuitry 710 is configured to perform processing described above, such as by executing instructions stored in memory 730. The processing circuitry 710 in this regard may implement certain functional means, units, or modules.

Figure 8:
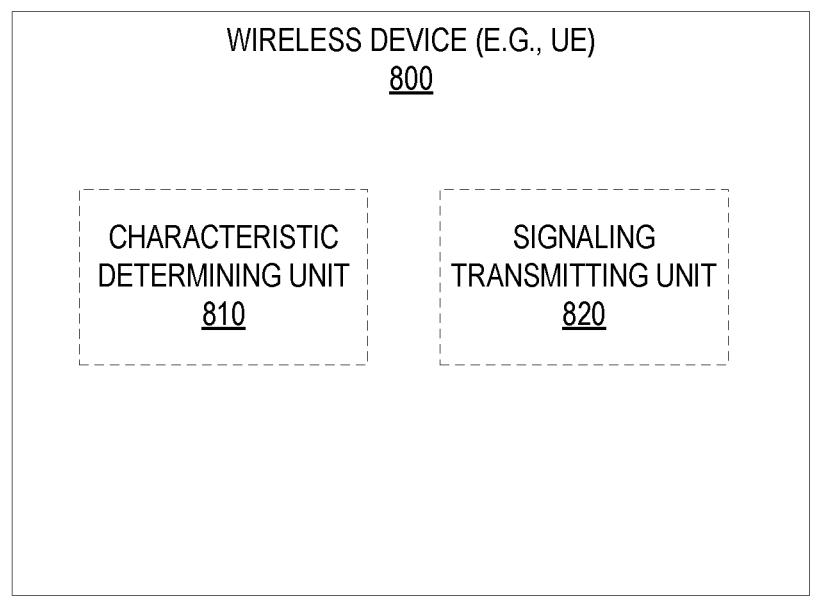
FIG. 8 is a block diagram of a wireless device according to other embodiments.
Figure 19:
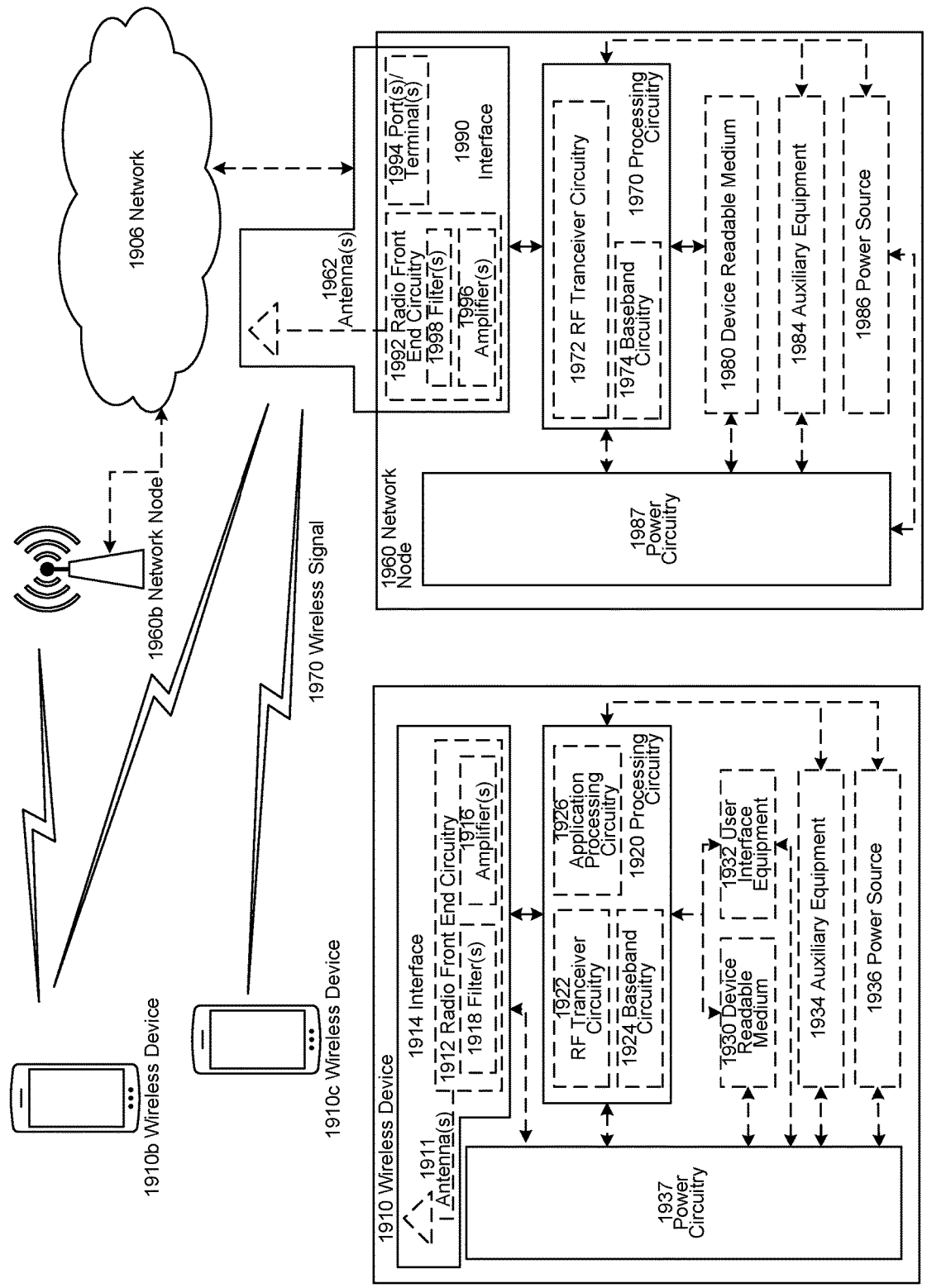
FIG. 19 is a block diagram of a wireless communication network according to some embodiments.

FIG. 8 illustrates a schematic block diagram of a wireless device 800 (e.g., wireless device 12A) in a wireless network according to still other embodiments (for example, the wireless network shown in FIG. 19). As shown, the wireless device 800 implements various functional means, units, or modules, e.g., via the processing circuitry 710 in FIG. 7 and/or via software code. These functional means, units, or modules, e.g., for implementing the method(s) herein, include for instance: characteristic determining unit 810 configured to determine, for each of one or more links 14, one or more characteristics associated with wireless device positioning performance on the link; and a signalling transmitting unit 820 configured to transmit control signaling 22 indicating the one or more characteristics determined for each of the one or more links.

Figure 9:
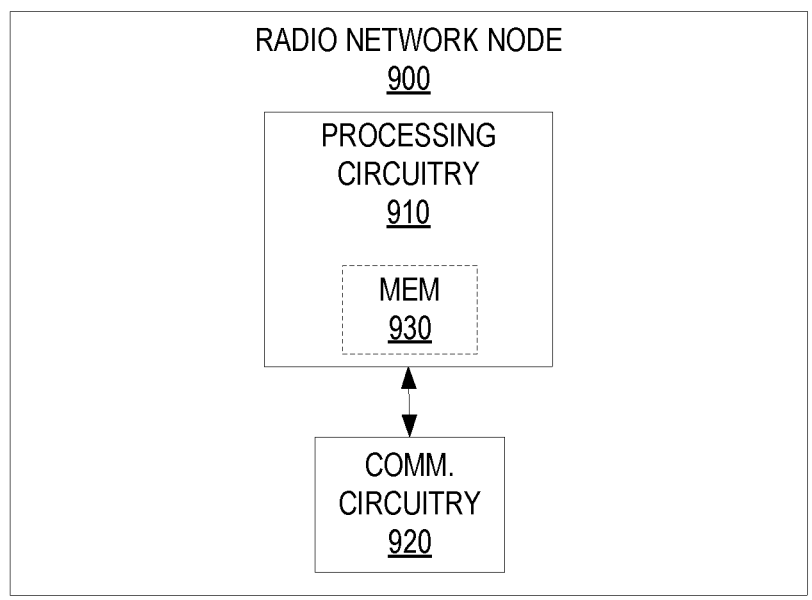
FIG. 9 is a block diagram of a radio network node according to some embodiments.

FIG. 9 illustrates a radio network node 900 (e.g., radio network node 30) as implemented in accordance with one or more embodiments. As shown, the radio network node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, such as by executing instructions stored in memory 930. The processing circuitry 910 in this regard may implement certain functional means, units, or modules.

Figure 10:
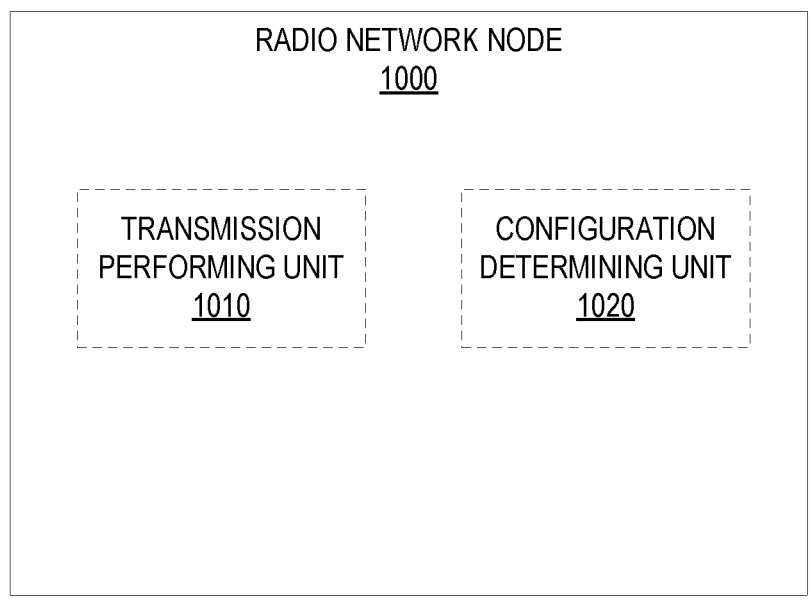
FIG. 10 is a block diagram of a radio network node according to other embodiments.

FIG. 10 illustrates a schematic block diagram of a radio network node 1000 in a wireless network according to still other embodiments (for example, the wireless network shown in FIG. 19). As shown, the radio network node 1000 implements various functional means, units, or modules, e.g., via the processing circuitry 910 in FIG. 9 and/or via software code. These functional means, units, or modules, e.g., for implementing the method(s) herein, include for instance: a transmission performing unit 1010 configured to perform PRS transmission on a link according to a PRS configuration; and a configuration determining unit 1020 configured to determine a different PRS configuration based on control signaling from a location server and/or from a wireless device. The transmission performing unit 1010 is also configured to perform PRS transmission on the link according to the different PRS configuration.

Figure 11:
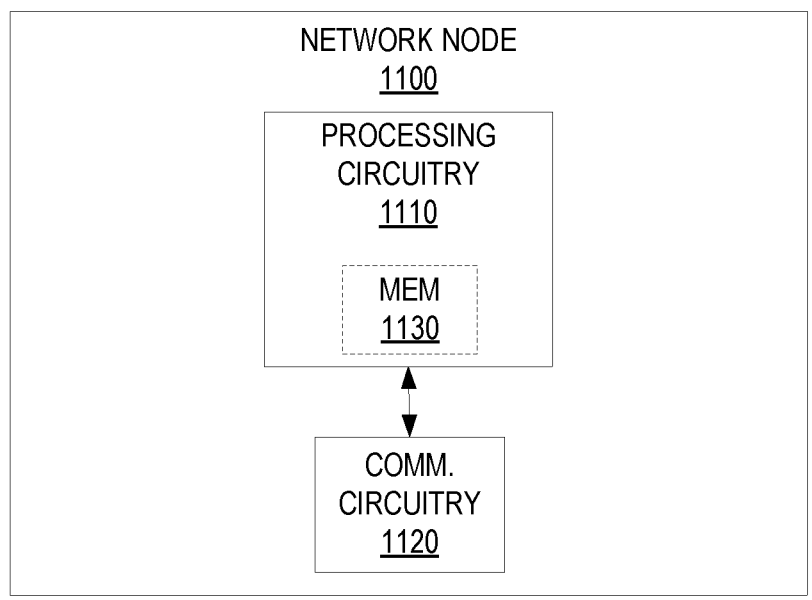
FIG. 11 is a block diagram of a network node according to some embodiments.

FIG. 11 illustrates a network node 1100 (e.g., network node 16) as implemented in accordance with one or more embodiments. The network node 1100 may operate as a radio network node, a location server or a positioning server. As shown, the network node 1100 includes processing circuitry 1110 and communication circuitry 1120. The communication circuitry 1120 is configured to transmit and/or receive information to and/or from one or more other nodes, e.g., via any communication technology. The processing circuitry 1110 is configured to perform processing described above, such as by executing instructions stored in memory 1130. The processing circuitry 1110 in this regard may implement certain functional means, units, or modules.

Figure 12:
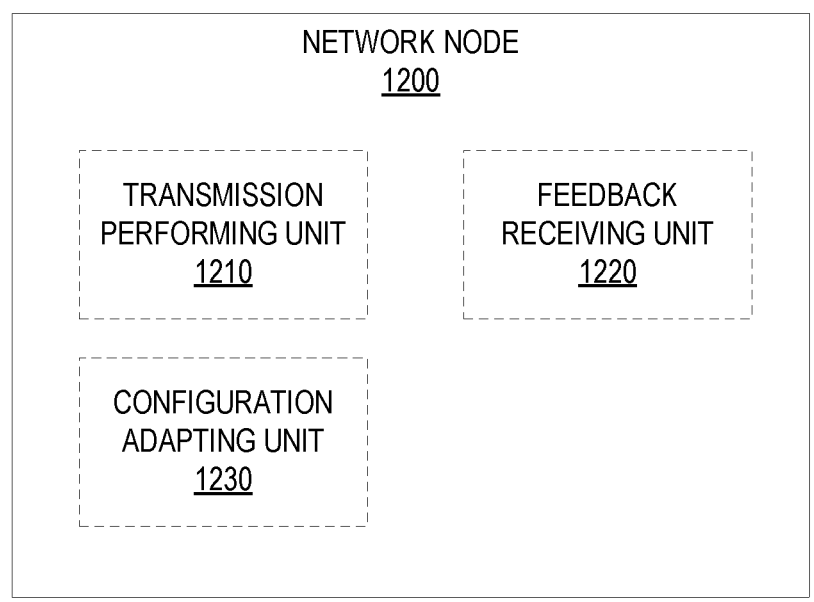
FIG. 12 is a block diagram of a network node according to other embodiments.

FIG. 12 illustrates a schematic block diagram of a network node 1200 (e.g., network node 16) in a wireless network according to still other embodiments (for example, the wireless network shown in FIG. 19). As shown, the network node 1200 implements various functional means, units, or modules, e.g., via the processing circuitry 1110 in FIG. 11 and/or via software code. These functional means, units, or modules, e.g., for implementing the method(s) herein, include for instance: a transmission performing unit 1210 configured to configure PRS transmission on a link in the wireless communication network; a feedback receiving unit 1220 configured to receive feedback about use of the configured PRS transmission for wireless device positioning; and a configuration adapting unit 1230 configured to, based on the received feedback, adapt configuration of the PRS transmission on the link.

Figure 13:
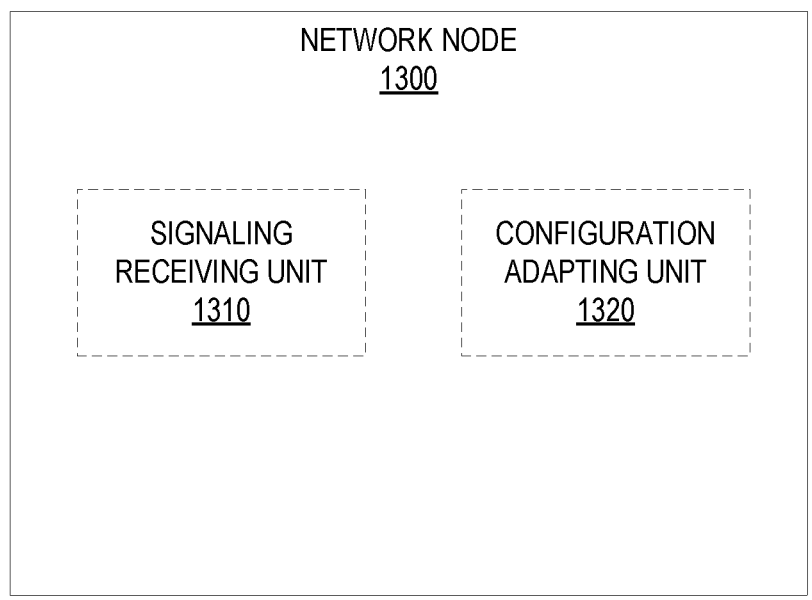
FIG. 13 is a block diagram of a network node according to still other embodiments.

FIG. 13 illustrates another schematic block diagram of a network node 1300 (e.g., network node 16) in a wireless network according to still other embodiments (for example, the wireless network shown in FIG. 19). As shown, the network node 1300 implements various functional means, units, or modules, e.g., via the processing circuitry 1110 in FIG. 11 and/or via software code. These functional means, units, or modules, e.g., for implementing the method(s) herein, include for instance: a signaling receiving unit 1310 configured to receive control signaling 22 that, for each of one or more links 14, indicates one or more characteristics associated with wireless device positioning performance on the link; and a configuration adapting unit 1320 configured to, based on the received control signaling, adapt PRS configuration on at least one of the one or more links.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

User equipment (UE) positioning is recognized as an important feature for 3GPP Long Term Evolution (LTE) networks due to its potential for massive commercial applications (e.g., intelligent transportation, entertainment, industry automation, robotics, remote operation, healthcare, smart parking, etc.) as well as its relevance to the Enhanced 911 requirements imposed by the United States' Federal Communication Commission.

Figure 14:
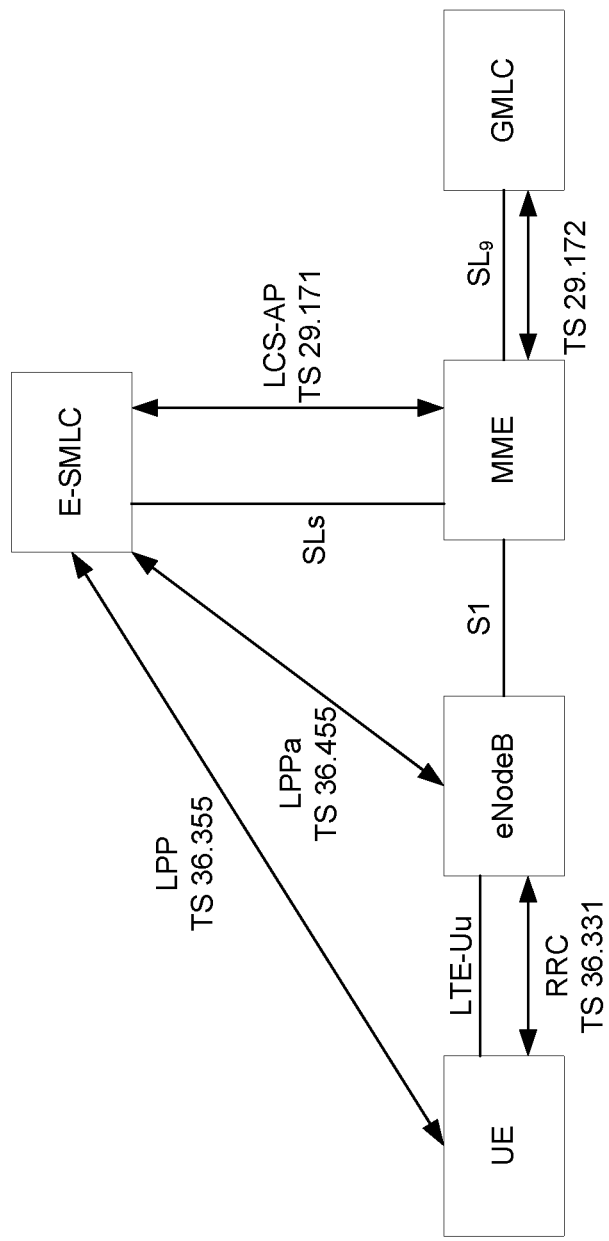
FIG. 14 is a block diagram of a positioning architecture in Long Term Evolution (LTE) according to some embodiments.

Positioning in LTE is supported by architecture such as shown in FIG. 14. Direct interactions occur between a UE and a location server (Evolved Serving Mobile Location Center, or E-SMLC) via the LTE Positioning Protocol (LPP). Moreover, there are also interactions between the location server and the eNodeB via the LPPa protocol, to some extent supported by interactions between the eNodeB and the UE via the Radio Resource Control (RRC) protocol.

The following positioning techniques are considered in LTE. First, the Enhanced Cell ID technique exploits cell ID information to associate the UE to the serving area of a serving cell, and then additional information to determine a finer granularity position. Second, the Assisted Global Navigation Satellite System (GNSS) technique uses information retrieved by the UE, supported by assistance information provided to the UE from E-SMLC. Third, in the OTDOA (Observed Time Difference of Arrival) technique, the UE estimates the time difference of reference signals from different base stations and sends the estimated time difference to the E-SMLC for multilateration. Fourth, in the UTDOA (Uplink TDOA) technique, the UE is requested to transmit a specific waveform that is detected by multiple location measurement units (e.g. an eNB) at known positions. These measurements are forwarded to E-SMLC for multilateration.

Figure 15:
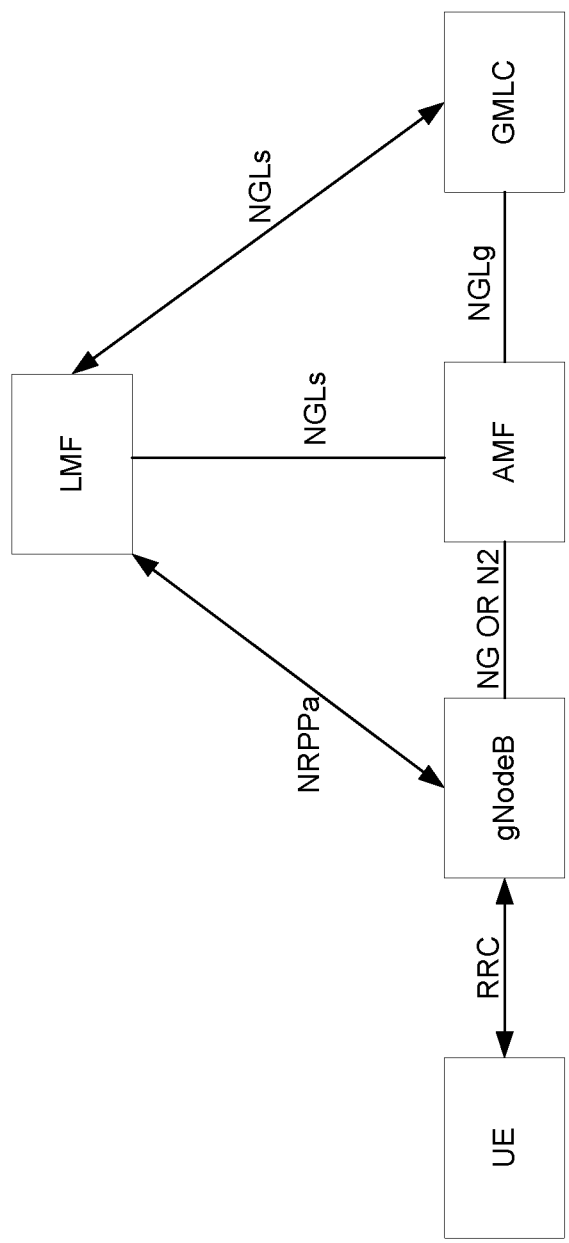
FIG. 15 is a block diagram of a positioning architecture in New Radio (NR) according to some embodiments.

Positioning in 3GPP New Radio (NR) is to be supported by the architecture shown in FIG. 15. The Location Management Function (LMF) is the location server in NR. There are also interactions between the location server and the radio network node via the NR Positioning Protocol A (NRPPa) protocol. The interactions between the radio network node and the device is supported via the Radio Resource Control (RRC) protocol. The interaction between UE and LMF is still not specified yet.

It is recognized herein that there are certain challenges. In the existing downlink positioning method, each radio network node transmits Positioning Reference Signals (PRS) with a pre-planned configuration and these PRSs are usually transmitted all the time. There is no real feedback between the positioning accuracy performance received by the UEs served by one radio network node and the contribution of each particular radio network node's PRS on this accuracy. This would result in a less-efficient downlink transmission as there is no dynamic change between the positioning accuracy and the transmission of PRSs.

Some embodiments herein may dynamically increase PRSs on cells that would result in Reference Signal Time Differences (RSTDs) that contribute significantly to position accuracy. This could minimize the downlink waste to accuracy ratio.

Certain embodiments may provide one or more of the following technical advantage(s). In some embodiments, wasted PRS transmissions may be avoided in downlink subframes for the cells that do not contribute to positioning accuracy. The unused downlink subframes can hence be used for other purposes. In some embodiments, the energy consumption of the network decreases as cells with bad RSTD quality are not transmitting PRSs. The overall overhead in OTDOA downlink positioning method is also drastically reduced in some embodiments. Some embodiments may provide an efficient and dynamic method to exploit the statistics from the previous positioning results.

According to some embodiments, a network node 16, such as a location server, collects statistics measurements from a first set of devices (e.g., including wireless device 12A in FIG. 1), in order to optimize the PRS configurations (i.e., first PRS configurations) of radio network nodes. The new PRS configurations (i.e., second/or third PRS configurations) are sent to a second set of devices (e.g., including wireless device 12B) for positioning at a later time. For example, the network node 16 may determine that PRS resources in the second and/or third PRS configurations are only to be spent on cells that provide low geometric dilution of precision (GDOP), have high quality reference signal time difference (RSTD) (e.g., cell close to UE), have high probability of being in in a line-of-sight (LOS) condition, etc.

FIG. 16 illustrates a method from the perspective of a network node (e.g., network node 16) operating as a location server, according to some embodiments. The location server may receive an indication of the UE capability for using statistics measurement from the first device (Optional Step 1600). Only devices with this capability that are willing to participate in the statistics measurement can be the target as the set of "first devices" in this context.

Next, the location server receives from the first device (e.g., wireless device 12A) one or more quality characteristics for the UE location based on radio signals from a set of radio network nodes, based on a first configuration (e.g., PRS configuration 18A in FIG. 1) (Step 1610). The one or more quality characteristics may include PRS quality, such as received signal quality and/or strength, Es/Iot, signal-to-interference-plus-noise-ratio (SINR), reference signal received quality (RSRQ), channel state information (CSI), etc. The one or more quality characteristics may alternatively or additionally include location quality or uncertainty, e.g., for UE-based positioning the UE may still assist the location server or radio network nodes transmitting PRS in optimizing PRS to improve its location estimation. Alternatively or additionally, the one or more quality characteristics may include GDOP, channel and LOS/NLOS characteristics, and/or a correlation property with a known PRS signal based on a first configuration. The one or more quality characteristics in this regard may include a statistical measure over time of any of the above (e.g., average, Xth percentile, median). Alternatively or additionally, the one or more quality characteristics may include an indication of one or more cells contributing to one or more of the above being below a first threshold and/or above a second threshold.

Alternatively or additionally, the location server receives a second PRS configuration suggested by the UE (Step 1610). In one embodiment, the second PRS configuration can be suggested by the first device, or it can be configured by the location server based on the received quality characteristics of the first PRS configuration received by the UE.

The location server then identifies that the PRS transmission of one or more radio network node is not efficiently configured and is not contributing to the UE positioning accuracy (Step 1620). In some embodiments, this step may be performed mainly according to the RSTD measurements or other quality characteristics received by the first device. Regardless, the location server then sends a second PRS configuration (e.g., adapted PRS configuration 18B) to those one or more radio network nodes (Step 1630). This second PRS configuration may be either configured by the location server or received as a suggestion by the first device In some embodiments, the location server sends third PRS configurations (e.g., adapted PRS configuration 18B or adapted PRS configuration 18C) of those one or more radio network nodes to a second device (Step 1640). The third PRS configurations may be the same as or based on the second PRS configuration. Prior to this step, the location server may receive acceptance from the target radio network nodes on the acceptance of the second PRS configuration or the suggestion of the third PRS configuration. In some later step, the location server sends assistance information to the new devices ("second devices") requesting positioning, including the new and updated PRS configurations.

Figure 17:
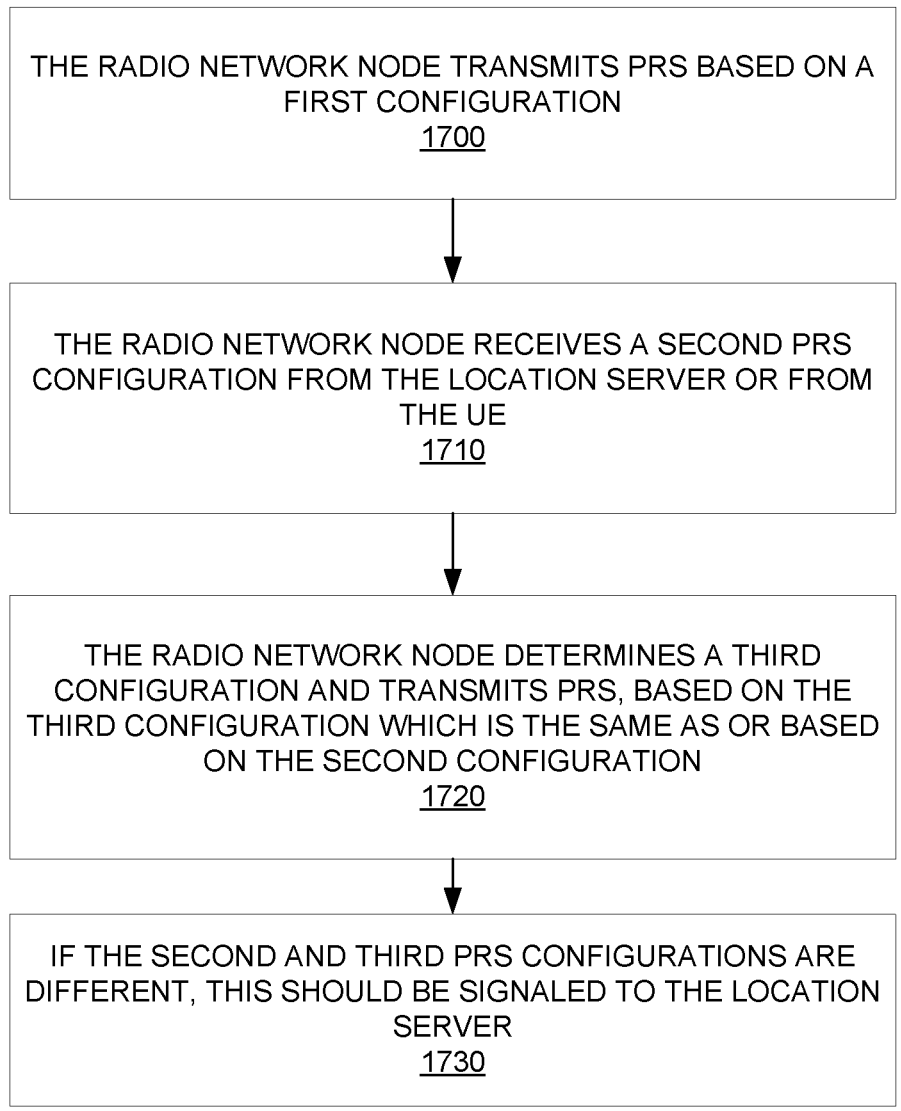
FIG. 17 is a logic flow diagram of a method performed by a radio network node according to some embodiments.

From a radio network node's perspective, illustrated by the example embodiment shown in FIG. 17, the radio network node (e.g., radio network node 30) first transmits PRS based on a first configuration (e.g., PRS configuration 18A) (Step 1700). The radio network node receives a second PRS configuration (e.g., adapted PRS configuration 18B) from the location server or from the UE (Step 1710). In one embodiment, the UE may send the suggested second PRS configuration directly to the radio network node. Regardless, the radio network node determines a third configuration (e.g., adapted PRS configuration 18C) and transmits PRS, based on the third configuration (Step 1720). The third configuration may be the same as or based on the second configuration. If the second and third PRS configurations are different, this should be signaled to the location server (Step 1730).

Figure 18:
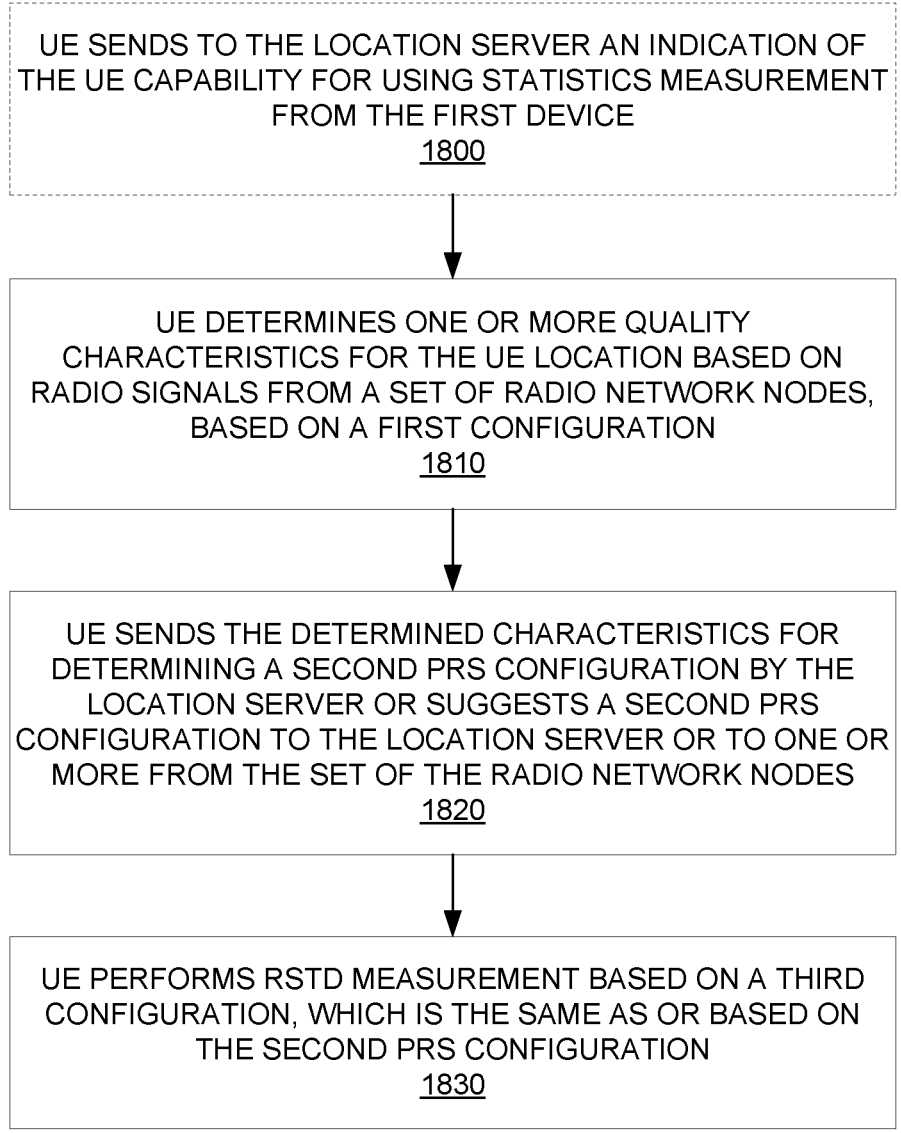
FIG. 18 is a logic flow diagram of a method performed by a user equipment (UE) according to some embodiments.

From a wireless device perspective, illustrated by the example embodiment in FIG. 18, the UE can optionally send to the location server an indication of the UE capability for using statistics measurement (Step 1800). This would categorize the UE as a first device herein. In some embodiments, the UE (e.g., wireless device 12A) determines one or more quality characteristics for the UE location based on radio signals from a set of radio network nodes, based on a first configuration (e.g., PRS configuration 18A) (Step 1810). The UE sends the determined characteristics for determining a second PRS configuration by the location server (step 1820). Or, the UE suggests a second PRS configuration to the location server, or sends the second PRS configuration directly to one or more from the set of the radio network nodes (Step 1820). In a later step, another device, here called the "second device" (e.g., wireless device 12B), performs RSTD measurement based on a third configuration (e.g., adapted PRS configuration 18B or 18C), which is the same as or based on the second PRS configuration (Step 1830).

Note that rather than the radio node being configured (manually or by O&M system) what to transmit and then the radio node informing the location server of this and the location server informing the UE when to listen, some embodiments herein include either: 1) the UE informs the radio node directly (e.g., over RRC) of quality characteristic (s), then the radio node adjusts and informs the location server; or 2) the UE informs the location server of quality characteristics and the location server instructs the radio node (directly or via O&M).

For the initial measurement, the CSI-RS-Density value ($\rho$) can be used to indicate the UE starting position and the number of the resource blocks in which it shall assume CSI-RS transmission. Furthermore, other higher-layer parameters such as CSI-RS-FreqBand and BWP-Info can be used to indicate adaptive, dense/sparse PRS configuration.

Consider now some examples of second or third PRS configurations, e.g., relative to the first PRS configuration. In one example, the second or third PRS configuration for a cell increases one or more of: (i) bandwidth over which PRS is transmitted; (ii) density of PRS; (iii) number of PRS resource elements (REs) within a resource block (RB) and/or subframe; and/or (iv) number of PRS subframes per positioning occasion. In another example, the second or third PRS configuration in a cell may reduce PRS frequency reuse. In either example, the second or third PRS configuration may be configured in this way when the quality characteristic of the cell is below a first threshold for N1 UEs (N1=1, 2, . . . ) or Y1% of UEs, where N1 and Y1 may be pre-defined or configured.

In another example, the second or third PRS configuration for a cell may decrease one or more of: (i) bandwidth over which PRS is transmitted; (ii) density of PRS; (iii) number of PRS REs within a RB and/or subframe; and/or (iv) number of PRS subframes per positioning occasion. In yet another example, the second or third PRS configuration for a cell may increase PRS frequency reuse. In either example, the second or third PRS configuration may be configured in this way when the quality characteristic of the cell is above a second threshold for N2 UEs (N2=1, 2, . . . ) or Y2% of UEs, where N2 and Y2 may be pre-defined or configured.

Note that, in the above, if the second configuration is suggested by the UE, then N1 and N2 would be 1, and Y1 and Y2 would not be applicable in this specific embodiment.

As for the combined effects of the density and the bandwidth, it can also be observed that more cells can transmit over the overlapping PRS bandwidths without causing interference when PRSs are sparse (fewer PRS RE per RB or smaller frequency reuse). But to compensate for fewer REs, a larger bandwidth may be needed. An advantage with overlapping bandwidths with sparse PRSs is that the UE will be able to receive PRSs from different cells without retuning to different frequencies and without measurement gaps.

In some embodiments, if PRS is transmitted through beams, the above embodiments for cells would be applicable for beams. The UE may send measurement evaluations per beam rather than per cell.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network 1906, network nodes 1960 and 1960b, and WDs 1910, 1910b, and 1910c. In practice, a wireless network may further include any additional elements suitable to support communication between wireless devices or between a wireless device and another communication device, such as a landline telephone, a service provider, or any other network node or end device. Of the illustrated components, network node 1960 and wireless device (WD) 1910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1960 and WD 1910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node 1960 includes processing circuitry 1970, device readable medium 1980, interface 1990, auxiliary equipment 1984, power source 1986, power circuitry 1987, and antenna 1962. Although network node 1960 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1960 are depicted as single boxes located within a larger box, or nested within multiple boxes, in practice, a network node may comprise multiple different physical components that make up a single illustrated component (e.g., device readable medium 1980 may comprise multiple separate hard drives as well as multiple RAM modules).

Similarly, network node 1960 may be composed of multiple physically separate components (e.g., a NodeB component and a RNC component, or a BTS component and a BSC component, etc.), which may each have their own respective components. In certain scenarios in which network node 1960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1960 may be configured to support multiple radio access technologies (RATs). In such embodiments, some components may be duplicated (e.g., separate device readable medium 1980 for the different RATs) and some components may be reused (e.g., the same antenna 1962 may be shared by the RATs). Network node 1960 may also include multiple sets of the various illustrated components for different wireless technologies integrated into network node 1960, such as, for example, GSM, WCDMA, LTE, NR, WiFi, or Bluetooth wireless technologies. These wireless technologies may be integrated into the same or different chip or set of chips and other components within network node 1960.

Processing circuitry 1970 is configured to perform any determining, calculating, or similar operations (e.g., certain obtaining operations) described herein as being provided by a network node. These operations performed by processing circuitry 1970 may include processing information obtained by processing circuitry 1970 by, for example, converting the obtained information into other information, comparing the obtained information or converted information to information stored in the network node, and/or performing one or more operations based on the obtained information or converted information, and as a result of said processing making a determination.

Processing circuitry 1970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1960 components, such as device readable medium 1980, network node 1960 functionality. For example, processing circuitry 1970 may execute instructions stored in device readable medium 1980 or in memory within processing circuitry 1970. Such functionality may include providing any of the various wireless features, functions, or benefits discussed herein. In some embodiments, processing circuitry 1970 may include a system on a chip (SOC).

In some embodiments, processing circuitry 1970 may include one or more of radio frequency (RF) transceiver circuitry 1972 and baseband processing circuitry 1974. In some embodiments, radio frequency (RF) transceiver circuitry 1972 and baseband processing circuitry 1974 may be on separate chips (or sets of chips), boards, or units, such as radio units and digital units. In alternative embodiments, part or all of RF transceiver circuitry 1972 and baseband processing circuitry 1974 may be on the same chip or set of chips, boards, or units In certain embodiments, some or all of the functionality described herein as being provided by a network node, base station, eNB or other such network device may be performed by processing circuitry 1970 executing instructions stored on device readable medium 1980 or memory within processing circuitry 1970. In alternative embodiments, some or all of the functionality may be provided by processing circuitry 1970 without executing instructions stored on a separate or discrete device readable medium, such as in a hard-wired manner. In any of those embodiments, whether executing instructions stored on a device readable storage medium or not, processing circuitry 1970 can be configured to perform the described functionality. The benefits provided by such functionality are not limited to processing circuitry 1970 alone or to other components of network node 1960, but are enjoyed by network node 1960 as a whole, and/or by end users and the wireless network generally.

Device readable medium 1980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1970. Device readable medium 1980 may store any suitable instructions, data or information, including a computer program, software, an application including one or more of logic, rules, code, tables, etc. and/or other instructions capable of being executed by processing circuitry 1970 and, utilized by network node 1960. Device readable medium 1980 may be used to store any calculations made by processing circuitry 1970 and/or any data received via interface 1990. In some embodiments, processing circuitry 1970 and device readable medium 1980 may be considered to be integrated.

Interface 1990 is used in the wired or wireless communication of signalling and/or data between network node 1960, network 1906, and/or WDs 1910. As illustrated, interface 1990 comprises port(s)/terminal(s) 1994 to send and receive data, for example to and from network 1906 over a wired connection. Interface 1990 also includes radio front end circuitry 1992 that may be coupled to, or in certain embodiments a part of, antenna 1962. Radio front end circuitry 1992 comprises filters 1998 and amplifiers 1996. Radio front end circuitry 1992 may be connected to antenna 1962 and processing circuitry 1970. Radio front end circuitry may be configured to condition signals communicated between antenna 1962 and processing circuitry 1970. Radio front end circuitry 1992 may receive digital data that is to be sent out to other network nodes or WDs via a wireless connection. Radio front end circuitry 1992 may convert the digital data into a radio signal having the appropriate channel and bandwidth parameters using a combination of filters 1998 and/or amplifiers 1996. The radio signal may then be transmitted via antenna 1962. Similarly, when receiving data, antenna 1962 may collect radio signals which are then converted into digital data by radio front end circuitry 1992. The digital data may be passed to processing circuitry 1970.

In other embodiments, the interface may comprise different components and/or different combinations of components.

In certain alternative embodiments, network node 1960 may not include separate radio front end circuitry 1992, instead, processing circuitry 1970 may comprise radio front end circuitry and may be connected to antenna 1962 without separate radio front end circuitry 1992. Similarly, in some embodiments, all or some of RF transceiver circuitry 1972 may be considered a part of interface 1990. In still other embodiments, interface 1990 may include one or more ports or terminals 1994, radio front end circuitry 1992, and RF transceiver circuitry 1972, as part of a radio unit (not shown), and interface 1990 may communicate with baseband processing circuitry 1974, which is part of a digital unit (not shown).

Antenna 1962 may include one or more antennas, or antenna arrays, configured to send and/or receive wireless signals. Antenna 1962 may be coupled to radio front end circuitry 1990 and may be any type of antenna capable of transmitting and receiving data and/or signals wirelessly. In some embodiments, antenna 1962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1962 may be separate from network node 1960 and may be connectable to network node 1960 through an interface or port.

Antenna 1962, interface 1990, and/or processing circuitry 1970 may be configured to perform any receiving operations and/or certain obtaining operations described herein as being performed by a network node. Any information, data and/or signals may be received from a wireless device, another network node and/or any other network equipment. Similarly, antenna 1962, interface 1990, and/or processing circuitry 1970 may be configured to perform any transmitting operations described herein as being performed by a network node. Any information, data and/or signals may be transmitted to a wireless device, another network node and/or any other network equipment.

Power circuitry 1987 may comprise, or be coupled to, power management circuitry and is configured to supply the components of network node 1960 with power for performing the functionality described herein. Power circuitry 1987 may receive power from power source 1986. Power source 1986 and/or power circuitry 1987 may be configured to provide power to the various components of network node 1960 in a form suitable for the respective components (e.g., at a voltage and current level needed for each respective component). Power source 1986 may either be included in, or external to, power circuitry 1987 and/or network node 1960. For example, network node 1960 may be connectable to an external power source (e.g., an electricity outlet) via an input circuitry or interface such as an electrical cable, whereby the external power source supplies power to power circuitry 1987. As a further example, power source 1986 may comprise a source of power in the form of a battery or battery pack which is connected to, or integrated in, power circuitry 1987. The battery may provide backup power should the external power source fail. Other types of power sources, such as photovoltaic devices, may also be used.

Alternative embodiments of network node 1960 may include additional components beyond those shown in FIG. 19 that may be responsible for providing certain aspects of the network node's functionality, including any of the functionality described herein and/or any functionality necessary to support the subject matter described herein. For example, network node 1960 may include user interface equipment to allow input of information into network node 1960 and to allow output of information from network node 1960. This may allow a user to perform diagnostic, maintenance, repair, and other administrative functions for network node 1960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1910 includes antenna 1911, interface 1914, processing circuitry 1920, device readable medium 1930, user interface equipment 1932, auxiliary equipment 1934, power source 1936 and power circuitry 1937. WD 1910 may include multiple sets of one or more of the illustrated components for different wireless technologies supported by WD 1910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1910.

Antenna 1911 may include one or more antennas or antenna arrays, configured to send and/or receive wireless signals, and is connected to interface 1914. In certain alternative embodiments, antenna 1911 may be separate from WD 1910 and be connectable to WD 1910 through an interface or port. Antenna 1911, interface 1914, and/or processing circuitry 1920 may be configured to perform any receiving or transmitting operations described herein as being performed by a WD. Any information, data and/or signals may be received from a network node and/or another WD. In some embodiments, radio front end circuitry and/or antenna 1911 may be considered an interface.

As illustrated, interface 1914 comprises radio front end circuitry 1912 and antenna 1911. Radio front end circuitry 1912 comprise one or more filters 1918 and amplifiers 1916. Radio front end circuitry 1914 is connected to antenna 1911 and processing circuitry 1920, and is configured to condition signals communicated between antenna 1911 and processing circuitry 1920. Radio front end circuitry 1912 may be coupled to or a part of antenna 1911. In some embodiments, WD 1910 may not include separate radio front end circuitry 1912; rather, processing circuitry 1920 may comprise radio front end circuitry and may be connected to antenna 1911. Similarly, in some embodiments, some or all of RF transceiver circuitry 1922 may be considered a part of interface 1914. Radio front end circuitry 1912 may receive digital data that is to be sent out to other network nodes or WDs via a wireless connection. Radio front end circuitry 1912 may convert the digital data into a radio signal having the appropriate channel and bandwidth parameters using a combination of filters 1918 and/or amplifiers 1916. The radio signal may then be transmitted via antenna 1911. Similarly, when receiving data, antenna 1911 may collect radio signals which are then converted into digital data by radio front end circuitry 1912. The digital data may be passed to processing circuitry 1920. In other embodiments, the interface may comprise different components and/or different combinations of components.

Processing circuitry 1920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1910 components, such as device readable medium 1930, WD 1910 functionality. Such functionality may include providing any of the various wireless features or benefits discussed herein. For example, processing circuitry 1920 may execute instructions stored in device readable medium 1930 or in memory within processing circuitry 1920 to provide the functionality disclosed herein.

As illustrated, processing circuitry 1920 includes one or more of RF transceiver circuitry 1922, baseband processing circuitry 1924, and application processing circuitry 1926. In other embodiments, the processing circuitry may comprise different components and/or different combinations of components. In certain embodiments processing circuitry 1920 of WD 1910 may comprise a SOC. In some embodiments, RF transceiver circuitry 1922, baseband processing circuitry 1924, and application processing circuitry 1926 may be on separate chips or sets of chips. In alternative embodiments, part or all of baseband processing circuitry 1924 and application processing circuitry 1926 may be combined into one chip or set of chips, and RF transceiver circuitry 1922 may be on a separate chip or set of chips. In still alternative embodiments, part or all of RF transceiver circuitry 1922 and baseband processing circuitry 1924 may be on the same chip or set of chips, and application processing circuitry 1926 may be on a separate chip or set of chips. In yet other alternative embodiments, part or all of RF transceiver circuitry 1922, baseband processing circuitry 1924, and application processing circuitry 1926 may be combined in the same chip or set of chips. In some embodiments, RF transceiver circuitry 1922 may be a part of interface 1914. RF transceiver circuitry 1922 may condition RF signals for processing circuitry 1920.

In certain embodiments, some or all of the functionality described herein as being performed by a WD may be provided by processing circuitry 1920 executing instructions stored on device readable medium 1930, which in certain embodiments may be a computer-readable storage medium. In alternative embodiments, some or all of the functionality may be provided by processing circuitry 1920 without executing instructions stored on a separate or discrete device readable storage medium, such as in a hard-wired manner. In any of those particular embodiments, whether executing instructions stored on a device readable storage medium or not, processing circuitry 1920 can be configured to perform the described functionality. The benefits provided by such functionality are not limited to processing circuitry 1920 alone or to other components of WD 1910, but are enjoyed by WD 1910 as a whole, and/or by end users and the wireless network generally.

Processing circuitry 1920 may be configured to perform any determining, calculating, or similar operations (e.g., certain obtaining operations) described herein as being performed by a WD. These operations, as performed by processing circuitry 1920, may include processing information obtained by processing circuitry 1920 by, for example, converting the obtained information into other information, comparing the obtained information or converted information to information stored by WD 1910, and/or performing one or more operations based on the obtained information or converted information, and as a result of said processing making a determination.

Device readable medium 1930 may be operable to store a computer program, software, an application including one or more of logic, rules, code, tables, etc. and/or other instructions capable of being executed by processing circuitry 1920. Device readable medium 1930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1920. In some embodiments, processing circuitry 1920 and device readable medium 1930 may be considered to be integrated.

User interface equipment 1932 may provide components that allow for a human user to interact with WD 1910. Such interaction may be of many forms, such as visual, audial, tactile, etc. User interface equipment 1932 may be operable to produce output to the user and to allow the user to provide input to WD 1910. The type of interaction may vary depending on the type of user interface equipment 1932 installed in WD 1910. For example, if WD 1910 is a smart phone, the interaction may be via a touch screen; if WD 1910 is a smart meter, the interaction may be through a screen that provides usage (e.g., the number of gallons used) or a speaker that provides an audible alert (e.g., if smoke is detected). User interface equipment 1932 may include input interfaces, devices and circuits, and output interfaces, devices and circuits. User interface equipment 1932 is configured to allow input of information into WD 1910, and is connected to processing circuitry 1920 to allow processing circuitry 1920 to process the input information. User interface equipment 1932 may include, for example, a microphone, a proximity or other sensor, keys/buttons, a touch display, one or more cameras, a USB port, or other input circuitry. User interface equipment 1932 is also configured to allow output of information from WD 1910, and to allow processing circuitry 1920 to output information from WD 1910. User interface equipment 1932 may include, for example, a speaker, a display, vibrating circuitry, a USB port, a headphone interface, or other output circuitry. Using one or more input and output interfaces, devices, and circuits, of user interface equipment 1932, WD 1910 may communicate with end users and/or the wireless network, and allow them to benefit from the functionality described herein.

Auxiliary equipment 1934 is operable to provide more specific functionality which may not be generally performed by WDs. This may comprise specialized sensors for doing measurements for various purposes, interfaces for additional types of communication such as wired communications etc. The inclusion and type of components of auxiliary equipment 1934 may vary depending on the embodiment and/or scenario.

Power source 1936 may, in some embodiments, be in the form of a battery or battery pack. Other types of power sources, such as an external power source (e.g., an electricity outlet), photovoltaic devices or power cells, may also be used. WD 1910 may further comprise power circuitry 1937 for delivering power from power source 1936 to the various parts of WD 1910 which need power from power source 1936 to carry out any functionality described or indicated herein. Power circuitry 1937 may in certain embodiments comprise power management circuitry. Power circuitry 1937 may additionally or alternatively be operable to receive power from an external power source; in which case WD 1910 may be connectable to the external power source (such as an electricity outlet) via input circuitry or an interface such as an electrical power cable. Power circuitry 1937 may also in certain embodiments be operable to deliver power from an external power source to power source 1936. This may be, for example, for the charging of power source 1936. Power circuitry 1937 may perform any formatting, converting, or other modification to the power from power source 1936 to make the power suitable for the respective components of WD 1910 to which power is supplied.

Figure 20:
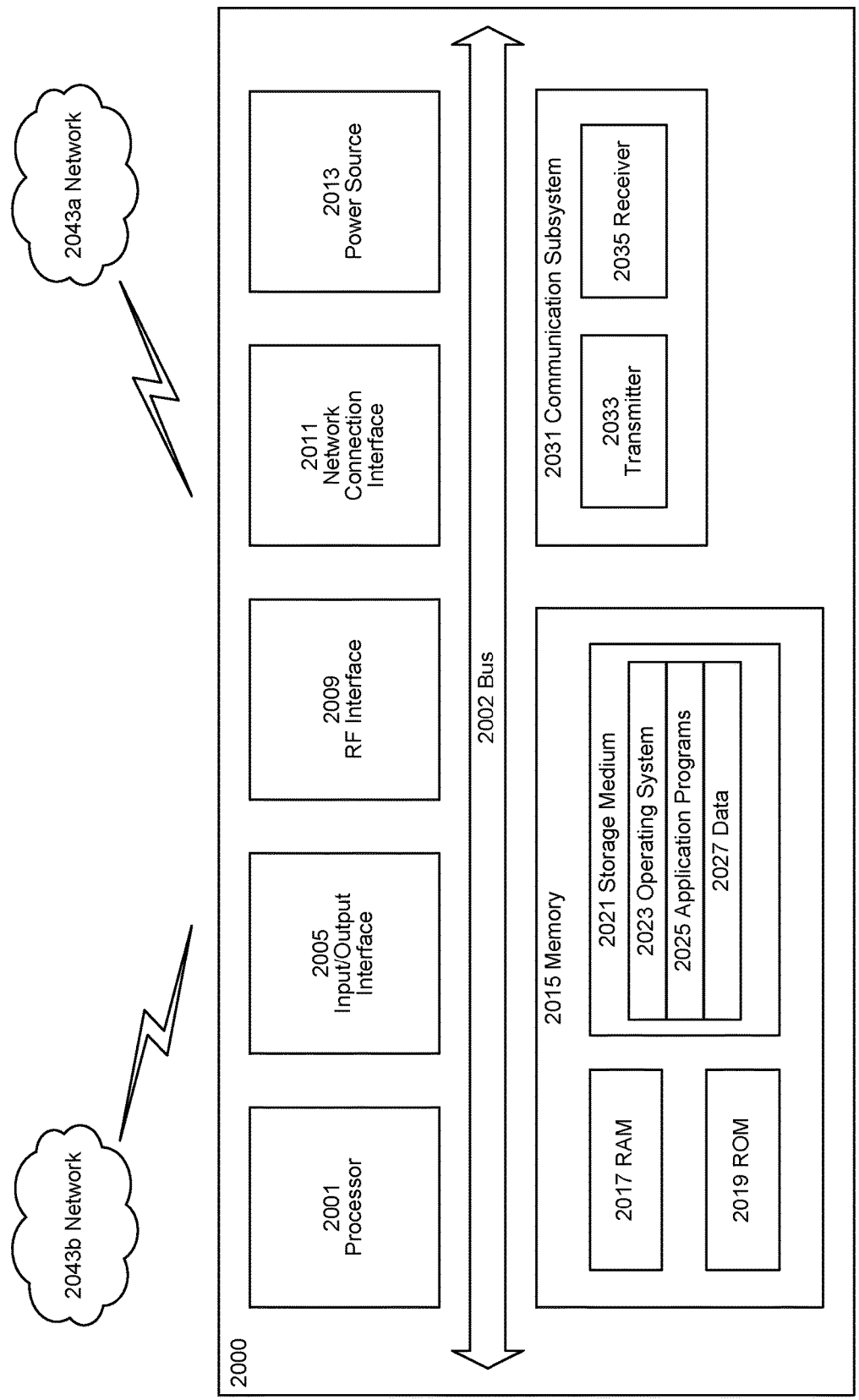
FIG. 20 is a block diagram of a user equipment according to some embodiments.

FIG. 20 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 20200 may be any UE identified by the $3^{rd}$ Generation Partnership Project (3GPP), including a NB-IoT UE, a machine type communication (MTC) UE, and/or an enhanced MTC (eMTC) UE. UE 2000, as illustrated in FIG. 20, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE 2000 includes processing circuitry 2001 that is operatively coupled to input/output interface 2005, radio frequency (RF) interface 2009, network connection interface 2011, memory 2015 including random access memory (RAM) 2017, read-only memory (ROM) 2019, and storage medium 2021 or the like, communication subsystem 2031, power source 2033, and/or any other component, or any combination thereof. Storage medium 2021 includes operating system 2023, application program 2025, and data 2027. In other embodiments, storage medium 2021 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry 2001 may be configured to process computer instructions and data. Processing circuitry 2001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2001 may include two central processing units (CPUs). Data may be information in a form suitable for use by a computer.

In the depicted embodiment, input/output interface 2005 may be configured to provide a communication interface to an input device, output device, or input and output device. UE 2000 may be configured to use an output device via input/output interface 2005. An output device may use the same type of interface port as an input device. For example, a USB port may be used to provide input to and output from UE 2000. The output device may be a speaker, a sound card, a video card, a display, a monitor, a printer, an actuator, an emitter, a smartcard, another output device, or any combination thereof. UE 2000 may be configured to use an input device via input/output interface 2005 to allow a user to capture information into UE 2000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface 2009 may be configured to provide a communication interface to RF components such as a transmitter, a receiver, and an antenna. Network connection interface 2011 may be configured to provide a communication interface to network 2043a. Network 2043a may encompass wired and/or wireless networks such as a local-area network (LAN), a wide-area network (WAN), a computer network, a wireless network, a telecommunications network, another like network or any combination thereof. For example, network 2043a may comprise a Wi-Fi network. Network connection interface 2011 may be configured to include a receiver and a transmitter interface used to communicate with one or more other devices over a communication network according to one or more communication protocols, such as Ethernet, TCP/IP, SONET, ATM, or the like. Network connection interface 2011 may implement receiver and transmitter functionality appropriate to the communication network links (e.g., optical, electrical, and the like). The transmitter and receiver functions may share circuit components, software or firmware, or alternatively may be implemented separately.

RAM 2017 may be configured to interface via bus 2002 to processing circuitry 2001 to provide storage or caching of data or computer instructions during the execution of software programs such as the operating system, application programs, and device drivers. ROM 2019 may be configured to provide computer instructions or data to processing circuitry 2001. For example, ROM 2019 may be configured to store invariant low-level system code or data for basic system functions such as basic input and output (I/O), startup, or reception of keystrokes from a keyboard that are stored in a non-volatile memory. Storage medium 2021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2021 may be configured to include operating system 2023, application program 2025 such as a web browser application, a widget or gadget engine or another application, and data file 2027. Storage medium 2021 may store, for use by UE 2000, any of a variety of various operating systems or combinations of operating systems.

Storage medium 2021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2021 may allow UE 2000 to access computer-executable instructions, application programs or the like, stored on transitory or non-transitory memory media, to off-load data, or to upload data. An article of manufacture, such as one utilizing a communication system may be tangibly embodied in storage medium 2021, which may comprise a device readable medium.

In FIG. 20, processing circuitry 2001 may be configured to communicate with network 2043b using communication subsystem 2031. Network 2043a and network 2043b may be the same network or networks or different network or networks. Communication subsystem 2031 may be configured to include one or more transceivers used to communicate with network 2043b. For example, communication subsystem 2031 may be configured to include one or more transceivers used to communicate with one or more remote transceivers of another device capable of wireless communication such as another WD, UE, or base station of a radio access network (RAN) according to one or more communication protocols, such as IEEE 802.20, CDMA, WCDMA, GSM, LTE, UTRAN, WiMax, or the like. Each transceiver may include transmitter 2033 and/or receiver 2035 to implement transmitter or receiver functionality, respectively, appropriate to the RAN links (e.g., frequency allocations and the like). Further, transmitter 2033 and receiver 2035 of each transceiver may share circuit components, software or firmware, or alternatively may be implemented separately.

In the illustrated embodiment, the communication functions of communication subsystem 2031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2031 may include cellular communication, Wi-Fi communication, Bluetooth communication, and GPS communication. Network 2043b may encompass wired and/or wireless networks such as a local-area network (LAN), a wide-area network (WAN), a computer network, a wireless network, a telecommunications network, another like network or any combination thereof. For example, network 2043b may be a cellular network, a Wi-Fi network, and/or a near-field network. Power source 2013 may be configured to provide alternating current (AC) or direct current (DC) power to components of UE 2000.

The features, benefits and/or functions described herein may be implemented in one of the components of UE 2000 or partitioned across multiple components of UE 2000. Further, the features, benefits, and/or functions described herein may be implemented in any combination of hardware, software or firmware. In one example, communication subsystem 2031 may be configured to include any of the components described herein. Further, processing circuitry 2001 may be configured to communicate with any of such components over bus 2002. In another example, any of such components may be represented by program instructions stored in memory that when executed by processing circuitry 2001 perform the corresponding functions described herein. In another example, the functionality of any of such components may be partitioned between processing circuitry 2001 and communication subsystem 2031. In another example, the non-computationally intensive functions of any of such components may be implemented in software or firmware and the computationally intensive functions may be implemented in hardware.

Figure 21:
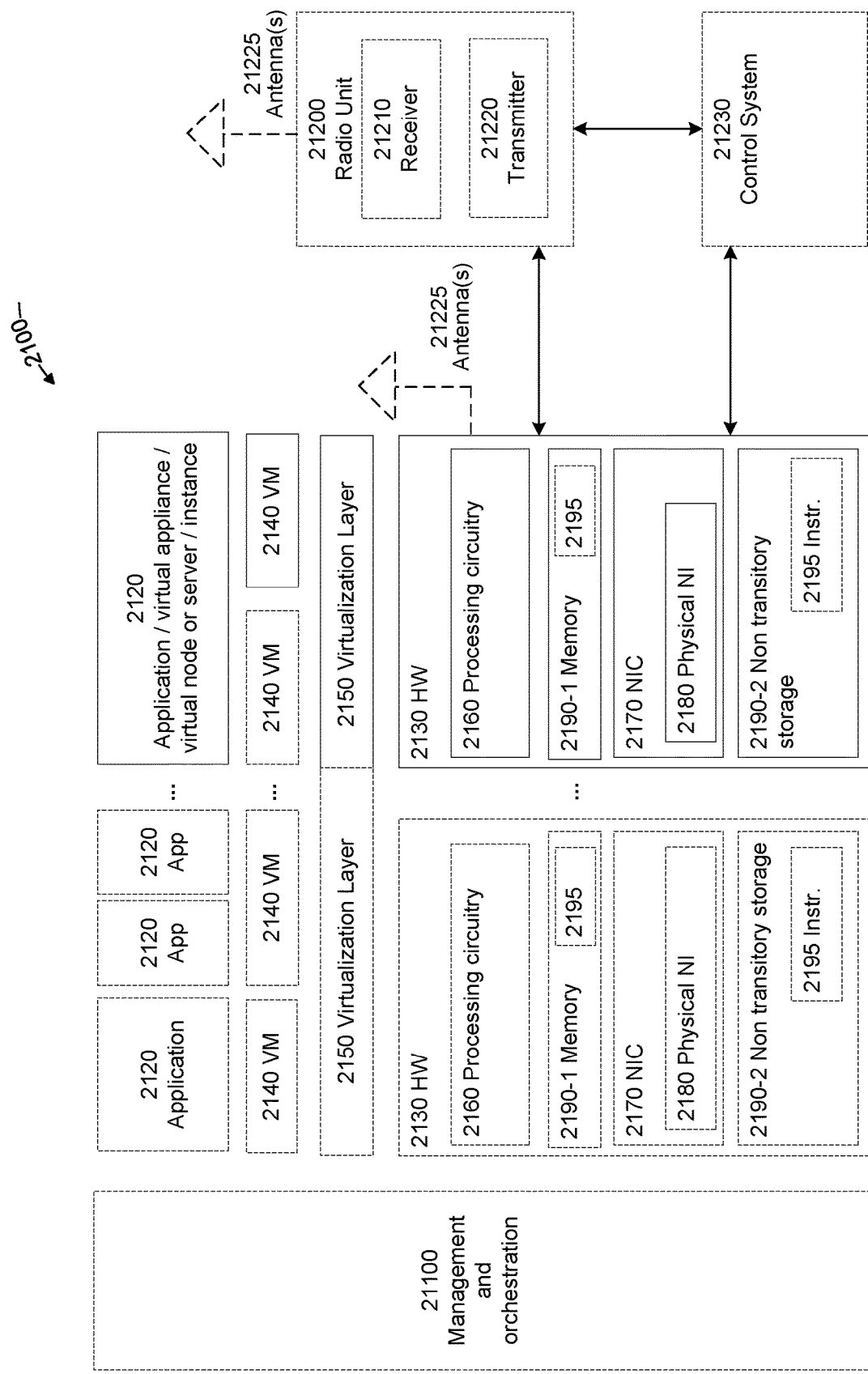
FIG. 21 is a block diagram of a virtualization environment according to some embodiments.

FIG. 21 is a schematic block diagram illustrating a virtualization environment 2100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2100 hosted by one or more of hardware nodes 2130. Further, in embodiments in which the virtual node is not a radio access node or does not require radio connectivity (e.g., a core network node), then the network node may be entirely virtualized.

The functions may be implemented by one or more applications 2120 (which may alternatively be called software instances, virtual appliances, network functions, virtual nodes, virtual network functions, etc.) operative to implement some of the features, functions, and/or benefits of some of the embodiments disclosed herein. Applications 2120 are run in virtualization environment 2100 which provides hardware 2130 comprising processing circuitry 2160 and memory 2190. Memory 2190 contains instructions 2195 executable by processing circuitry 2160 whereby application 2120 is operative to provide one or more of the features, benefits, and/or functions disclosed herein.

Virtualization environment 2100, comprises general-purpose or special-purpose network hardware devices 2130 comprising a set of one or more processors or processing circuitry 2160, which may be commercial off-the-shelf (COTS) processors, dedicated Application Specific Integrated Circuits (ASICs), or any other type of processing circuitry including digital or analog hardware components or special purpose processors. Each hardware device may comprise memory 2190-1 which may be non-persistent memory for temporarily storing instructions 2195 or software executed by processing circuitry 2160. Each hardware device may comprise one or more network interface controllers (NICs) 2170, also known as network interface cards, which include physical network interface 2180. Each hardware device may also include non-transitory, persistent, machine-readable storage media 2190-2 having stored therein software 2195 and/or instructions executable by processing circuitry 2160. Software 2195 may include any type of software including software for instantiating one or more virtualization layers 2150 (also referred to as hypervisors), software to execute virtual machines 2140 as well as software allowing it to execute functions, features and/or benefits described in relation with some embodiments described herein.

Virtual machines 2140, comprise virtual processing, virtual memory, virtual networking or interface and virtual storage, and may be run by a corresponding virtualization layer 2150 or hypervisor. Different embodiments of the instance of virtual appliance 2120 may be implemented on one or more of virtual machines 2140, and the implementations may be made in different ways.

During operation, processing circuitry 2160 executes software 2195 to instantiate the hypervisor or virtualization layer 2150, which may sometimes be referred to as a virtual machine monitor (VMM). Virtualization layer 2150 may present a virtual operating platform that appears like networking hardware to virtual machine 2140.

As shown in FIG. 21, hardware 2130 may be a standalone network node with generic or specific components. Hardware 2130 may comprise antenna 21225 and may implement some functions via virtualization. Alternatively, hardware 2130 may be part of a larger cluster of hardware (e.g. such as in a data center or customer premise equipment (CPE)) where many hardware nodes work together and are managed via management and orchestration (MANO) 21100, which, among others, oversees lifecycle management of applications 2120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2140 may be a software implementation of a physical machine that runs programs as if they were executing on a physical, non-virtualized machine. Each of virtual machines 2140, and that part of hardware 2130 that executes that virtual machine, be it hardware dedicated to that virtual machine and/or hardware shared by that virtual machine with others of the virtual machines 2140, forms a separate virtual network elements (VNE).

Still in the context of NFV, Virtual Network Function (VNF) is responsible for handling specific network functions that run in one or more virtual machines 2140 on top of hardware networking infrastructure 2130 and corresponds to application 2120 in FIG. 21.

In some embodiments, one or more radio units 21200 that each include one or more transmitters 21220 and one or more receivers 21210 may be coupled to one or more antennas 21225. Radio units 21200 may communicate directly with hardware nodes 2130 via one or more appropriate network interfaces and may be used in combination with the virtual components to provide a virtual node with radio capabilities, such as a radio access node or a base station.

In some embodiments, some signalling can be effected with the use of control system 21230 which may alternatively be used for communication between the hardware nodes 2130 and radio units 21200.

Figure 22:
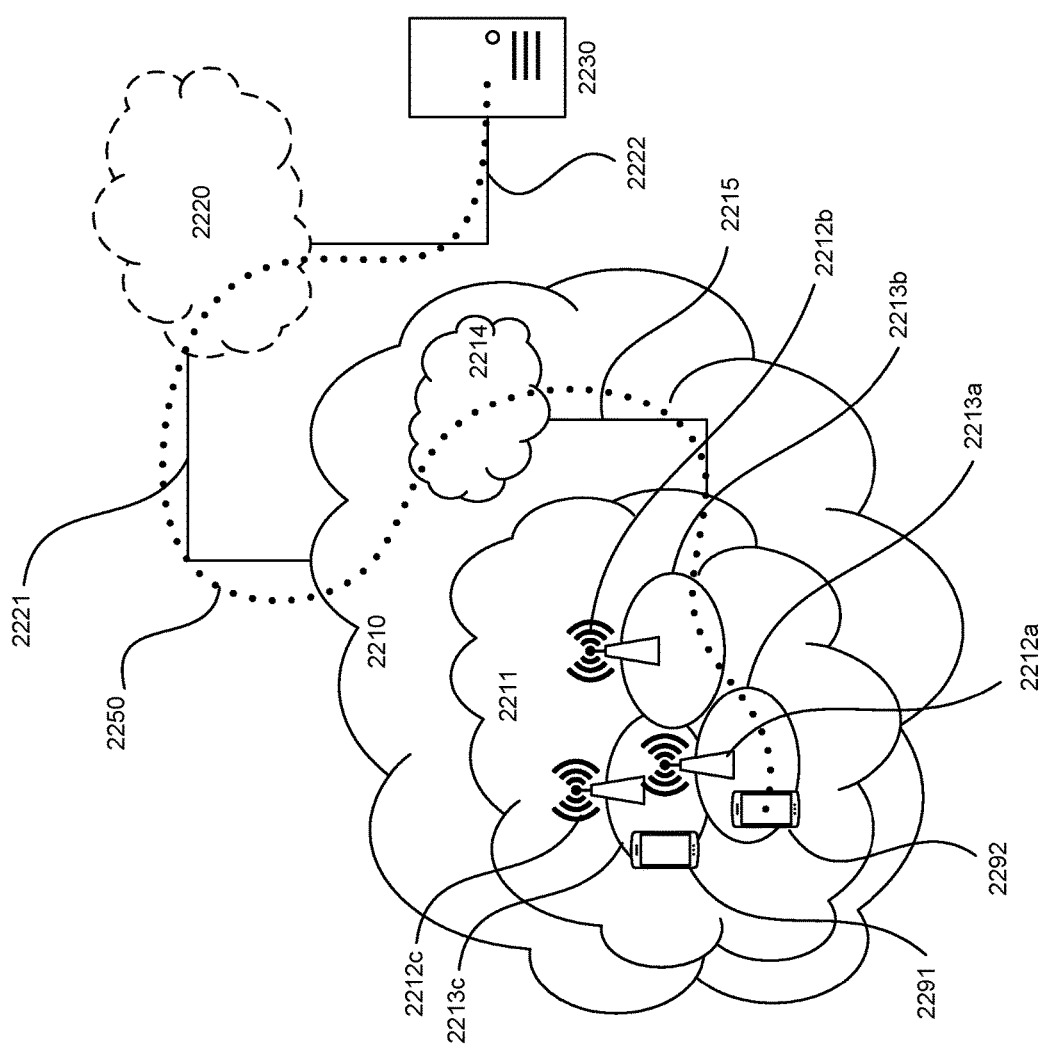
FIG. 22 is a block diagram of a communication network with a host computer according to some embodiments.

FIG. 22 illustrates a telecommunication network connected via an intermediate network to a host computer in accordance with some embodiments. In particular, with reference to FIG. 22, in accordance with an embodiment, a communication system includes telecommunication network 2210, such as a 3GPP-type cellular network, which comprises access network 2211, such as a radio access network, and core network 2214. Access network 2211 comprises a plurality of base stations 2212a, 2212b, 2212c, such as NBs, eNBs, gNBs or other types of wireless access points, each defining a corresponding coverage area 2213a, 2213b, 2213c. Each base station 2212a, 2212b, 2212c is connectable to core network 2214 over a wired or wireless connection 2215. A first UE 2291 located in coverage area 2213c is configured to wirelessly connect to, or be paged by, the corresponding base station 2212c. A second UE 2292 in coverage area 2213a is wirelessly connectable to the corresponding base station 2212a. While a plurality of UEs 2291, 2292 are illustrated in this example, the disclosed embodiments are equally applicable to a situation where a sole UE is in the coverage area or where a sole UE is connecting to the corresponding base station 2212.

Telecommunication network 2210 is itself connected to host computer 2230, which may be embodied in the hardware and/or software of a standalone server, a cloud-implemented server, a distributed server or as processing resources in a server farm. Host computer 2230 may be under the ownership or control of a service provider, or may be operated by the service provider or on behalf of the service provider. Connections 2221 and 2222 between telecommunication network 2210 and host computer 2230 may extend directly from core network 2214 to host computer 2230 or may go via an optional intermediate network 2220. Intermediate network 2220 may be one of, or a combination of more than one of, a public, private or hosted network; intermediate network 2220, if any, may be a backbone network or the Internet; in particular, intermediate network 2220 may comprise two or more sub-networks (not shown).

The communication system of FIG. 22 as a whole enables connectivity between the connected UEs 2291, 2292 and host computer 2230. The connectivity may be described as an over-the-top (OTT) connection 2250. Host computer 2230 and the connected UEs 2291, 2292 are configured to communicate data and/or signaling via OTT connection 2250, using access network 2211, core network 2214, any intermediate network 2220 and possible further infrastructure (not shown) as intermediaries. OTT connection 2250 may be transparent in the sense that the participating communication devices through which OTT connection 2250 passes are unaware of routing of uplink and downlink communications. For example, base station 2212 may not or need not be informed about the past routing of an incoming downlink communication with data originating from host computer 2230 to be forwarded (e.g., handed over) to a connected UE 2291. Similarly, base station 2212 need not be aware of the future routing of an outgoing uplink communication originating from the UE 2291 towards the host computer 2230.

Figure 23:
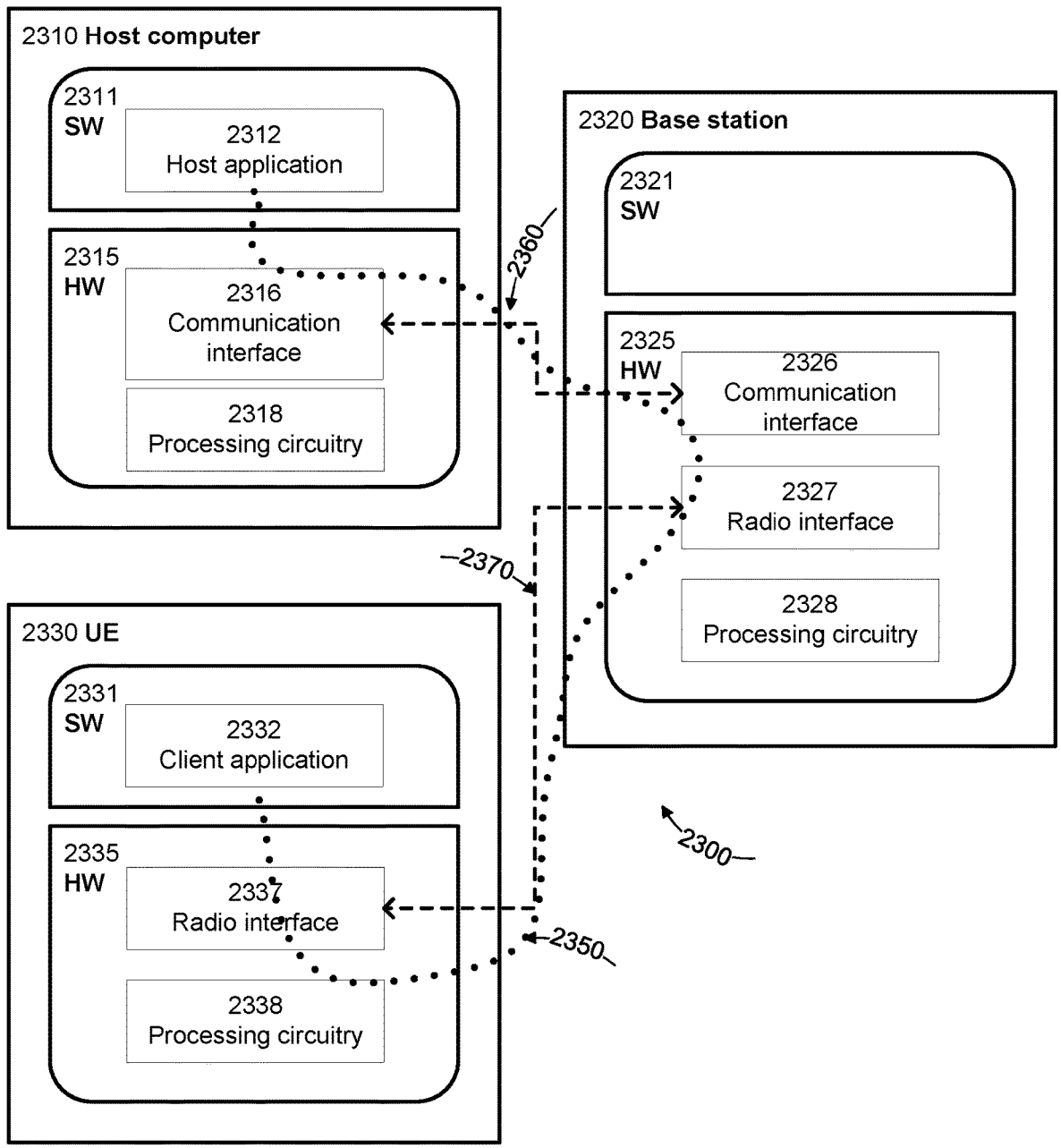
FIG. 23 is a block diagram of a host computer according to some embodiments.

Example implementations, in accordance with an embodiment, of the UE, base station and host computer discussed in the preceding paragraphs will now be described with reference to FIG. 23. FIG. 23 illustrates host computer communicating via a base station with a user equipment over a partially wireless connection in accordance with some embodiments In communication system 2300, host computer 2310 comprises hardware 2315 including communication interface 2316 configured to set up and maintain a wired or wireless connection with an interface of a different communication device of communication system 2300. Host computer 2310 further comprises processing circuitry 2318, which may have storage and/or processing capabilities. In particular, processing circuitry 2318 may comprise one or more programmable processors, application-specific integrated circuits, field programmable gate arrays or combinations of these (not shown) adapted to execute instructions. Host computer 2310 further comprises software 2311, which is stored in or accessible by host computer 2310 and executable by processing circuitry 2318. Software 2311 includes host application 2312. Host application 2312 may be operable to provide a service to a remote user, such as UE 2330 connecting via OTT connection 2350 terminating at UE 2330 and host computer 2310. In providing the service to the remote user, host application 2312 may provide user data which is transmitted using OTT connection 2350.

Communication system 2300 further includes base station 2320 provided in a telecommunication system and comprising hardware 2325 enabling it to communicate with host computer 2310 and with UE 2330. Hardware 2325 may include communication interface 2326 for setting up and maintaining a wired or wireless connection with an interface of a different communication device of communication system 2300, as well as radio interface 2327 for setting up and maintaining at least wireless connection 2370 with UE 2330 located in a coverage area (not shown in FIG. 23) served by base station 2320. Communication interface 2326 may be configured to facilitate connection 2360 to host computer 2310. Connection 2360 may be direct or it may pass through a core network (not shown in FIG. 23) of the telecommunication system and/or through one or more intermediate networks outside the telecommunication system. In the embodiment shown, hardware 2325 of base station 2320 further includes processing circuitry 2328, which may comprise one or more programmable processors, application-specific integrated circuits, field programmable gate arrays or combinations of these (not shown) adapted to execute instructions. Base station 2320 further has software 2321 stored internally or accessible via an external connection.

Communication system 2300 further includes UE 2330 already referred to. Its hardware 2335 may include radio interface 2337 configured to set up and maintain wireless connection 2370 with a base station serving a coverage area in which UE 2330 is currently located. Hardware 2335 of UE 2330 further includes processing circuitry 2338, which may comprise one or more programmable processors, application-specific integrated circuits, field programmable gate arrays or combinations of these (not shown) adapted to execute instructions. UE 2330 further comprises software 2331, which is stored in or accessible by UE 2330 and executable by processing circuitry 2338. Software 2331 includes client application 2332. Client application 2332 may be operable to provide a service to a human or non-human user via UE 2330, with the support of host computer 2310. In host computer 2310, an executing host application 2312 may communicate with the executing client application 2332 via OTT connection 2350 terminating at UE 2330 and host computer 2310. In providing the service to the user, client application 2332 may receive request data from host application 2312 and provide user data in response to the request data. OTT connection 2350 may transfer both the request data and the user data. Client application 2332 may interact with the user to generate the user data that it provides.

It is noted that host computer 2310, base station 2320 and UE 2330 illustrated in FIG. 23 may be similar or identical to host computer 2230, one of base stations 2212a, 2212b, 2212c and one of UEs 2291, 2292 of FIG. 22, respectively. This is to say, the inner workings of these entities may be as shown in FIG. 23 and independently, the surrounding network topology may be that of FIG. 22.

In FIG. 23, OTT connection 2350 has been drawn abstractly to illustrate the communication between host computer 2310 and UE 2330 via base station 2320, without explicit reference to any intermediary devices and the precise routing of messages via these devices. Network infrastructure may determine the routing, which it may be configured to hide from UE 2330 or from the service provider operating host computer 2310, or both. While OTT connection 2350 is active, the network infrastructure may further take decisions by which it dynamically changes the routing (e.g., on the basis of load balancing consideration or reconfiguration of the network).

Wireless connection 2370 between UE 2330 and base station 2320 is in accordance with the teachings of the embodiments described throughout this disclosure. One or more of the various embodiments improve the performance of OTT services provided to UE 2330 using OTT connection 2350, in which wireless connection 2370 forms the last segment. More precisely, the embodiments described herein help to avoid wasted PRS transmissions in downlink subframes for the cells that do not contribute to positioning accuracy. The unused downlink subframes can hence be used for other purposes. The energy consumption of the network decreases as cells with bad RSTD quality are not transmitting PRSs. The overall overhead in OTDOA downlink positioning method is also drastically reduced. The embodiments may provide an efficient and dynamic method to exploit the statistics from the previous positioning results the teachings of these embodiments may improve the data rate, latency and power consumption of the devices and network and thereby provide benefits such as better responsiveness, capacity and battery lifetime.

A measurement procedure may be provided for the purpose of monitoring data rate, latency and other factors on which the one or more embodiments improve. There may further be an optional network functionality for reconfiguring OTT connection 2350 between host computer 2310 and UE 2330, in response to variations in the measurement results. The measurement procedure and/or the network functionality for reconfiguring OTT connection 2350 may be implemented in software 2311 and hardware 2315 of host computer 2310 or in software 2331 and hardware 2335 of UE 2330, or both. In embodiments, sensors (not shown) may be deployed in or in association with communication devices through which OTT connection 2350 passes; the sensors may participate in the measurement procedure by supplying values of the monitored quantities exemplified above, or supplying values of other physical quantities from which software 2311, 2331 may compute or estimate the monitored quantities. The reconfiguring of OTT connection 2350 may include message format, retransmission settings, preferred routing etc.; the reconfiguring need not affect base station 2320, and it may be unknown or imperceptible to base station 2320. Such procedures and functionalities may be known and practiced in the art. In certain embodiments, measurements may involve proprietary UE signaling facilitating host computer 2310's measurements of throughput, propagation times, latency and the like. The measurements may be implemented in that software 2311 and 2331 causes messages to be transmitted, in particular empty or 'dummy' messages, using OTT connection 2350 while it monitors propagation times, errors etc.

Figure 24:
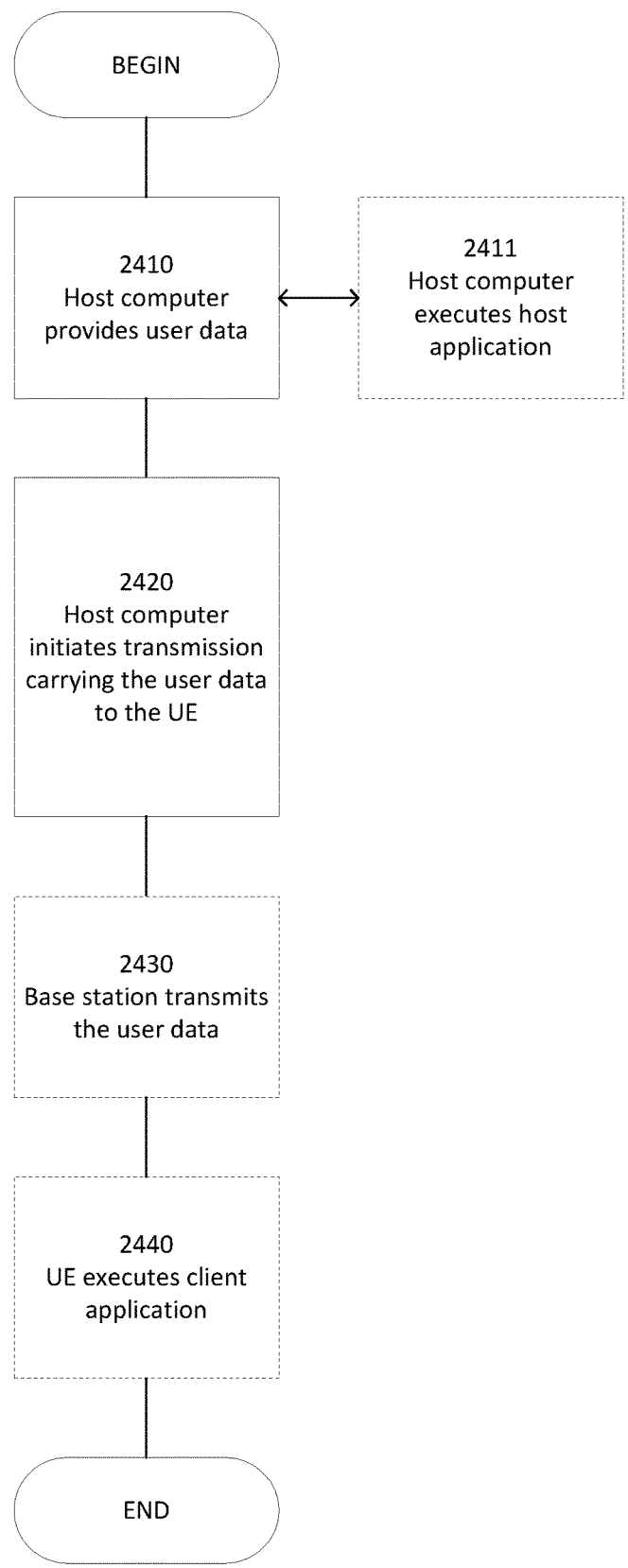
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In step 2410, the host computer provides user data. In substep 2411 (which may be optional) of step 2410, the host computer provides the user data by executing a host application. In step 2420, the host computer initiates a transmission carrying the user data to the UE. In step 2430 (which may be optional), the base station transmits to the UE the user data which was carried in the transmission that the host computer initiated, in accordance with the teachings of the embodiments described throughout this disclosure. In step 2440 (which may also be optional), the UE executes a client application associated with the host application executed by the host computer.

Figure 25:
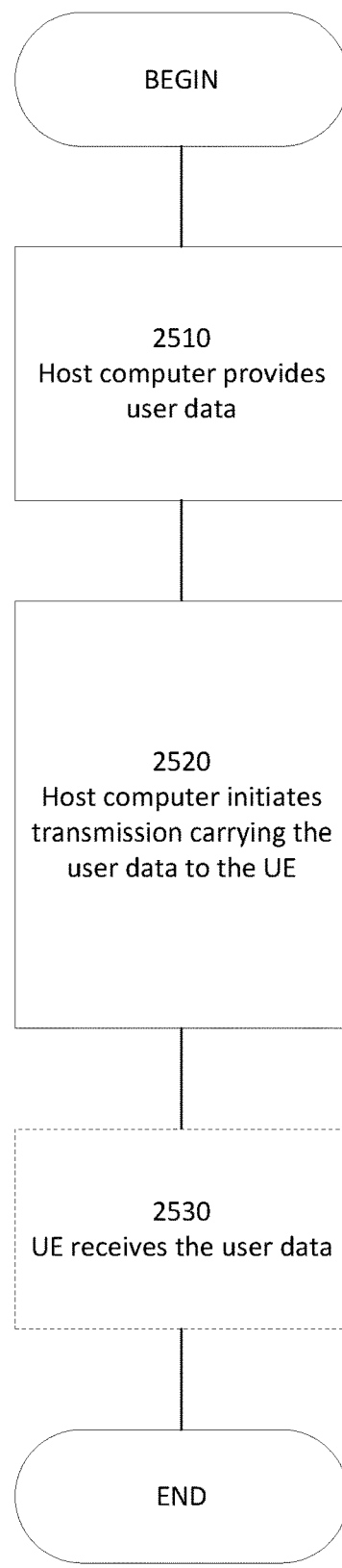
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step 2510 of the method, the host computer provides user data. In an optional substep (not shown) the host computer provides the user data by executing a host application. In step 2520, the host computer initiates a transmission carrying the user data to the UE. The transmission may pass via the base station, in accordance with the teachings of the embodiments described throughout this disclosure. In step 2530 (which may be optional), the UE receives the user data carried in the transmission.

Figure 26:
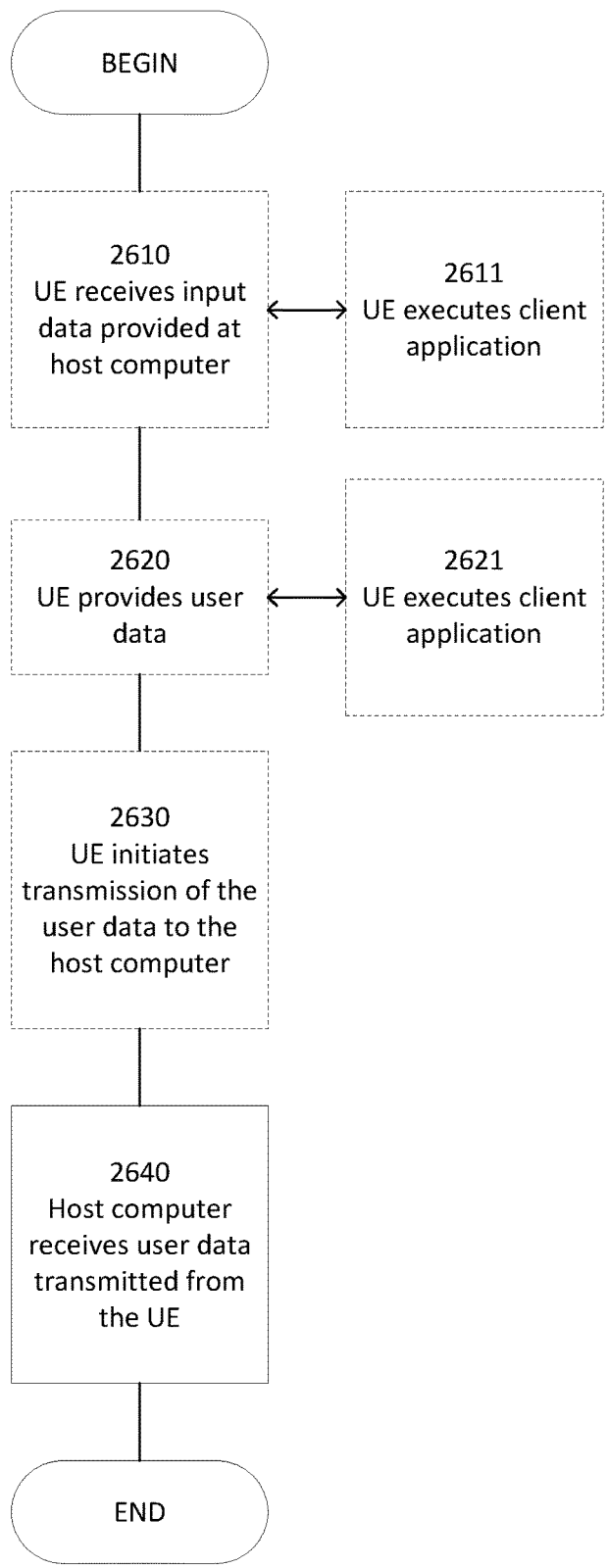
FIG. 26 is a flowchart illustrating a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In step 2610 (which may be optional), the UE receives input data provided by the host computer. Additionally or alternatively, in step 2620, the UE provides user data. In substep 2621 (which may be optional) of step 2620, the UE provides the user data by executing a client application. In substep 2611 (which may be optional) of step 2610, the UE executes a client application which provides the user data in reaction to the received input data provided by the host computer. In providing the user data, the executed client application may further consider user input received from the user. Regardless of the specific manner in which the user data was provided, the UE initiates, in substep 2630 (which may be optional), transmission of the user data to the host computer. In step 2640 of the method, the host computer receives the user data transmitted from the UE, in accordance with the teachings of the embodiments described throughout this disclosure.

Figure 27:
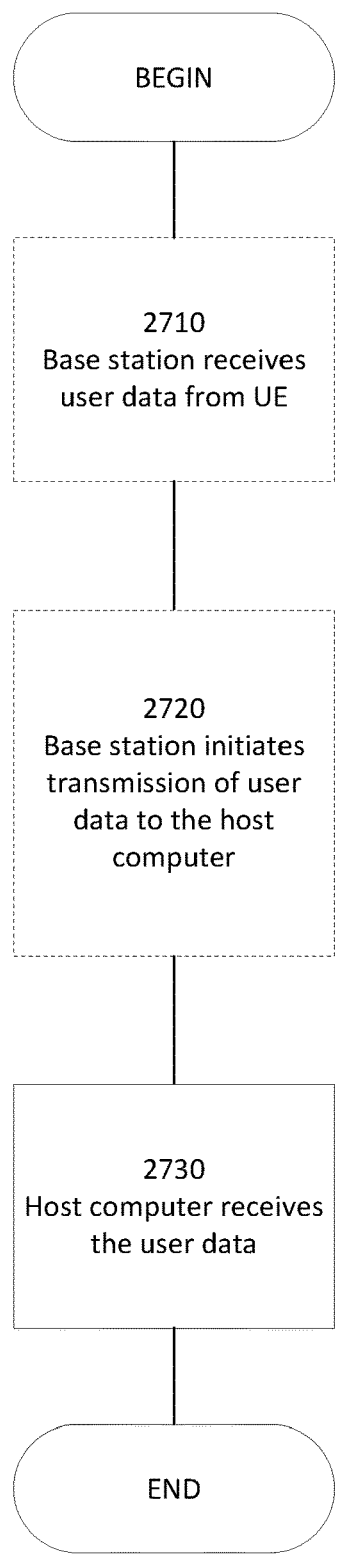
FIG. 27 is a flowchart illustrating a method implemented in a communication system, in accordance with one embodiment.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In step 2710 (which may be optional), in accordance with the teachings of the embodiments described throughout this disclosure, the base station receives user data from the UE. In step 2720 (which may be optional), the base station initiates transmission of the received user data to the host computer. In step 2730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
    determining, for each of one or more links, one or more characteristics associated with wireless device positioning performance on the link, wherein the one or more characteristics include one or more of:
        geometric dilution of precision (GDOP) characteristics associated with the link; or
        line-of-sight (LOS) characteristics or non-LOS characteristics of the link; and
    transmitting control signaling indicating the one or more characteristics determined for each of the one or more links.

2. The method of claim 1, wherein:
    the GDOP characteristics associated with the link include whether the link contributes to GDOP less than a GDOP threshold; and/or
    the LOS characteristics or non-LOS characteristics of the link include whether the link has a probability of being in a LOS condition above a LOS probability threshold.

3. The method of claim 1, wherein the control signaling, for each of the one or more links, indicates or depends on an extent to which positioning reference signal (PRS) transmission on the link contributes to or detracts from accuracy of wireless device positioning.

4. The method of claim 1, wherein the control signaling indicates, for each of the one or more links, a statistical measure over time of at least one of the one or more characteristics.

5. The method of claim 1, wherein said determining comprises determining the one or more characteristics for each of the one or more links by measuring a positioning reference signal (PRS) transmitted on the link according to a first PRS configuration, wherein the method further comprises:
    after transmitting the control signaling, receiving from a location server a second PRS configuration different than the first PRS configuration according to which the wireless device is to monitor for or measure PRS on one or more links; and
    monitoring for or measuring PRS according to the second PRS configuration.

6. The method of claim 1, wherein said determining comprises determining the LOS characteristics or non-LOS characteristics of each of the one or more links by correlating a positioning reference signal (PRS) transmitted on the link with a known PRS transmission.

7. A method performed by a network node in a wireless communication network, the method comprising:
    receiving control signaling that, for each of one or more links, indicates one or more characteristics associated with wireless device positioning performance on the link, wherein the one or more characteristics include one or more of:
        geometric dilution of precision (GDOP) characteristics associated with the link; or
        line-of-sight (LOS) characteristics or non-LOS characteristics of the link; and
    based on the received control signaling, adapting positioning reference signal, PRS, configuration on at least one of the one or more links.

8. The method of claim 7, wherein:
    the GDOP characteristics associated with the link include whether the link contributes to GDOP less than a GDOP threshold; and/or
    the LOS characteristics or non-LOS characteristics of the link include whether the link has a probability of being in a LOS condition above a LOS probability threshold.

9. The method of claim 7, wherein the control signaling, for each of the one or more links, indicates or depends on an extent to which positioning reference signal (PRS) transmission on the link contributes to or detracts from accuracy of wireless device positioning.

10. The method of claim 7, wherein the control signaling indicates, for each of the one or more links, a statistical measure over time of at least one of the one or more characteristics.

11. The method of claim 7, wherein said adapting comprises adapting PRS configuration on at least one of the one or more links to transmit PRS on more radio resources on the at least one link or to reduce PRS frequency reuse, responsive to determining, based on the control signaling, that one or more of:
    wireless device positioning performance on the at least one link is less than a first performance threshold;
    at least one of the one or more characteristics is less than a first characteristic threshold; or
    PRS transmission on the at least one link contributes to accuracy of wireless device positioning less than a first threshold extent.

12. The method of claim 7, wherein said adapting comprises adapting PRS configuration on at least one of the one or more links to transmit PRS on fewer radio resources on the at least one link or to increase PRS frequency reuse, responsive to determining, based on the control signaling, that:
   wireless device positioning performance on the at least one link is greater than a second performance threshold;
   at least one of the one or more characteristics is greater than a second characteristic threshold; or
   PRS transmission on the at least one link contributes to accuracy of wireless device positioning more than a second threshold extent.

13. The method of claim 7, wherein said adapting comprises adapting PRS configuration on at least one of the one or more links to no longer transmit PRS on the at least one link, responsive to determining, based on the control signaling, that PRS transmission on the at least one link contributes to accuracy of wireless device positioning less than a third threshold extent, that wireless device positioning performance on the at least one link is less than a third performance threshold, or that at least one of the one or more characteristics is less than a third characteristic threshold.

14. The method of claim 7, wherein said adapting comprises adapting PRS configuration on at least one of the one or more links to no longer transmit PRS on the at least one link, responsive to determining, based on the control signaling, that one or more of:
   the at least one link contributes to a geometric dilution of precision (GDOP) being higher than a GDOP threshold; or
   the at least one link has a probability of being in LOS condition below a LOS probability threshold.

15. The method of claim 7, wherein said adapting comprising determining an adapted configuration of the PRS transmission on the at least one link and transmitting the adapted configuration to a radio network node that serves the at least one link.

16. The method of claim 7, wherein the network node is a radio network node that serves at least one of the one or more links, and wherein the method further comprises transmitting control signaling to a location server indicating the adapted configuration of PRS transmission on at least one of the one or more links.

17. A wireless device comprising:
   communication circuitry; and
   processing circuitry configured to:
   determine, for each of one or more links, one or more characteristics associated with wireless
      device positioning performance on the link, wherein the one or more characteristics include one or more of:
         geometric dilution of precision, GDOP, characteristics associated with the link; or
         line-of-sight, LOS, characteristics or non-LOS characteristics of the link; and
   transmit control signaling indicating the one or more characteristics determined for each of the one or more links.

18. The wireless device of claim 17, wherein:
   the GDOP characteristics associated with the link include whether the link contributes to GDOP less than a GDOP threshold; and/or
   the LOS characteristics or non-LOS characteristics of the link include whether the link has a probability of being in a LOS condition above a LOS probability threshold.

19. The wireless device of claim 17, wherein the control signaling, for each of the one or more links, indicates or depends on an extent to which positioning reference signal (PRS) transmission on the link contributes to or detracts from accuracy of wireless device positioning.

20. The wireless device of claim 17, wherein the control signaling indicates, for each of the one or more links, a statistical measure over time of at least one of the one or more characteristics.

21. The wireless device of claim 17, wherein the processing circuitry is configured to determine the one or more characteristics for each of the one or more links by measuring a positioning reference signal (PRS) transmitted on the link according to a first PRS configuration, wherein the processing circuitry is further configured to:
   after transmitting the control signaling, receive from a location server a second PRS configuration different than the first PRS configuration according to which the wireless device is to monitor for or measure PRS on one or more links; and
   monitor for or measuring PRS according to the second PRS configuration.

22. The wireless device of claim 17, wherein the processing circuitry is configured to determine the LOS characteristics or non-LOS characteristics of each of the one or more links by correlating a positioning reference signal (PRS) transmitted on the link with a known PRS transmission.

23. A network node configured for use in a wireless communication network, the network node comprising:
   communication circuitry; and
   processing circuitry configured to:
      receive control signaling that, for each of one or more links, indicates one or more characteristics associated with wireless device positioning performance on the link, wherein the one or more characteristics include one or more of:
         geometric dilution of precision, GDOP, characteristics associated with the link; or
         line-of-sight, LOS, characteristics or non-LOS characteristics of the link; and
      based on the received control signaling, adapt positioning reference signal, PRS, configuration on at least one of the one or more links.

24. The network node of claim 23, wherein:
   the GDOP characteristics associated with the link include whether the link contributes to GDOP less than a GDOP threshold; and/or
   the LOS characteristics or non-LOS characteristics of the link include whether the link has a probability of being in a LOS condition above a LOS probability threshold.

25. The network node of claim 23, wherein the control signaling, for each of the one or more links, indicates or depends on an extent to which positioning reference signal (PRS) transmission on the link contributes to or detracts from accuracy of wireless device positioning.

26. The network node of claim 23, wherein the control signaling indicates, for each of the one or more links, a statistical measure over time of at least one of the one or more characteristics.

* * * * *